(12) United States Patent
Venolia et al.

(10) Patent No.: US 10,476,968 B2
(45) Date of Patent: Nov. 12, 2019

(54) PROVIDING A SHARED USER EXPERIENCE OF FACILITATE COMMUNICATION

(71) Applicant: Microsoft Corporation, Redmond, WA (US)

(72) Inventors: Gina D. Venolia, Bellevue, WA (US); John C. Tang, Palo Alto, CA (US); Anoop Gupta, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 470 days.

(21) Appl. No.: 14/242,848

(22) Filed: Apr. 1, 2014

(65) Prior Publication Data

US 2015/0281369 A1 Oct. 1, 2015

(51) Int. Cl.
| | | |
|---|---|---|
| *H04L 29/08* | (2006.01) | |
| *G06Q 10/06* | (2012.01) | |
| *G06Q 10/10* | (2012.01) | |
| *G06Q 50/00* | (2012.01) | |

(52) U.S. Cl.
CPC ........... *H04L 67/141* (2013.01); *G06Q 10/06* (2013.01); *G06Q 10/10* (2013.01); *G06Q 50/01* (2013.01)

(58) Field of Classification Search
CPC .... H04L 67/41; H04L 67/22; G06F 17/30424
See application file for complete search history.

(56) References Cited

U.S. PATENT DOCUMENTS

| | | |
|---|---|---|
| 5,960,173 A | 9/1999 | Tang et al. |
| 6,295,551 B1 | 9/2001 | Roberts et al. |
| 6,496,201 B1 * | 12/2002 | Baldwin .................. H04N 7/15 348/14.08 |
| 6,975,622 B2 | 12/2005 | Korycki et al. |
| 7,106,725 B2 | 9/2006 | Andaker et al. |
| 7,922,493 B1 | 4/2011 | Gennaro et al. |

(Continued)

FOREIGN PATENT DOCUMENTS

| | | |
|---|---|---|
| CN | 1744488 A | 3/2006 |
| WO | 2009097153 A1 | 8/2009 |

(Continued)

OTHER PUBLICATIONS

Cheverst et al., "Exploiting Context to Support Social Awareness and Social Navigation," SIGGROUP Bulletin, vol. 21, No. 3, Dec. 2000, pp. 43-48, 6 pages.

(Continued)

*Primary Examiner* — Moustafa M Meky
*Assistant Examiner* — SM Z Islam
(74) *Attorney, Agent, or Firm* — Rainier Patents, P.S.

(57) ABSTRACT

A communication augmentation agent (CAA) is described herein which presents a shared user experience to at least a first user and a second user. In one manner of operation, the CAA operates by intelligently determining. (1) when to offer a shared user experience to the users; (b) the particular form of the shared user experience; and (c) the manner of delivering the shared user experience to the users. In determining the form of the shared experience, the CAA can optionally customize the shared resource so that it includes common-interest information and, with respect to each user, user-specific information. The CAA also includes a mechanism by which a registered user may invite a non-registered user to take part in the shared user experience.

24 Claims, 20 Drawing Sheets

(56) References Cited

U.S. PATENT DOCUMENTS

| | | | |
|---|---|---|---|
| 7,970,436 B1 | 6/2011 | Katzer et al. | |
| 8,301,879 B2 | 10/2012 | Ramanathan et al. | |
| 8,358,746 B2 | 1/2013 | Adkar et al. | |
| 8,537,930 B2 | 9/2013 | Roth et al. | |
| 2002/0065090 A1* | 5/2002 | Ohba | H04B 7/18582 455/503 |
| 2002/0169855 A1* | 11/2002 | Maehiro | H04L 29/1215 709/219 |
| 2002/0173345 A1 | 11/2002 | Swerup | |
| 2005/0131721 A1* | 6/2005 | Doctorow | G06Q 30/00 705/1.1 |
| 2006/0128306 A1 | 6/2006 | Jung et al. | |
| 2008/0090592 A1 | 4/2008 | Tsuchiya | |
| 2008/0096544 A1 | 4/2008 | McNamara et al. | |
| 2008/0107100 A1* | 5/2008 | Begeja | H04M 3/4872 370/352 |
| 2008/0146256 A1 | 6/2008 | Hawkins et al. | |
| 2008/0163312 A1* | 7/2008 | Faust | H04N 7/163 725/93 |
| 2009/0094531 A1 | 4/2009 | Danieli et al. | |
| 2009/0123047 A1* | 5/2009 | Yfantis | G06T 7/12 382/131 |
| 2009/0135806 A1 | 5/2009 | Pulhug | |
| 2009/0181699 A1 | 7/2009 | Tysowski | |
| 2009/0254614 A1 | 10/2009 | Brush et al. | |
| 2009/0307361 A1 | 12/2009 | Issa et al. | |
| 2009/0327282 A1 | 12/2009 | Wittig | |
| 2010/0023934 A1* | 1/2010 | Sheehan | G06F 9/44536 717/168 |
| 2010/0029302 A1 | 2/2010 | Lee et al. | |
| 2010/0274569 A1 | 10/2010 | Reudink | |
| 2010/0318622 A1* | 12/2010 | Granito | G06Q 10/107 709/206 |
| 2011/0044438 A1* | 2/2011 | Wang | H04L 65/4015 379/93.02 |
| 2011/0312303 A1 | 12/2011 | Brush et al. | |
| 2012/0023157 A1* | 1/2012 | Roth | H04L 67/306 709/203 |
| 2012/0140908 A1 | 6/2012 | Sana et al. | |
| 2012/0284638 A1 | 8/2012 | Matthew et al. | |
| 2012/0239761 A1* | 9/2012 | Linner | G06F 17/2765 709/206 |
| 2012/0314852 A1 | 12/2012 | Suri et al. | |
| 2013/0159173 A1* | 6/2013 | Sivaraman | G06Q 20/22 705/39 |
| 2013/0210488 A1* | 8/2013 | Lee | G06F 9/452 455/557 |
| 2014/0075576 A1* | 3/2014 | Joseph | H04N 21/2541 726/29 |
| 2014/0269313 A1* | 9/2014 | Liu | H04W 24/02 370/235 |
| 2015/0143409 A1* | 5/2015 | Maughan | H04N 21/262 725/34 |

FOREIGN PATENT DOCUMENTS

| | | |
|---|---|---|
| WO | 2011161022 A1 | 12/2011 |
| WO | 2012175995 A1 | 12/2012 |
| WO | 2013162976 A1 | 10/2013 |

OTHER PUBLICATIONS

Wiltse, Heather and Jeffrey Nichols, "PlayByPlay: Collaborative Web Browsing for Desktop and Mobile Devices," Proceedings of the 27th International Conference on Human Factors in Computing Systems, Apr. 4-9, 2009, pp. 1781-1790, 10 pages.

Voida et al., "Share and Share Alike: Exploring the User Interface Affordances of File Sharing," Proceedings of the ACM Conference on Human Factors in Computing Systems (CHI 2006), Apr. 22-27, 2006, pp. 221-230, 10 pages.

Chapanis et al., "Studies in Interactive Communication: I. The Effects of Four Communication Modes on the Behavior of Teams During Cooperative Problem-Solving," Human Factors, 1972, 14 (6), pp. 487-509, 23 pages.

Second Written Opinion dated Jun. 7, 2016 from PCT Patent Application No. PCT/US2015/022877, 6 pages.

PCT Search Report and Written Opinion for PCT/U52015/022877, dated Jul. 6, 2015, 9 pages.

International Preliminary Report on Patentability dated Aug. 26, 2016 from PCT Patent Application No. PCT/US2015/022877, 7 pages.

"FonePal" home page, available at <<http://shuminzhai.com/FonePal.htm>>, accessed on Apr. 3, 2014, 1 page.

Yin, et al., "The Benefits of Augmenting Telephone Voice Menu Navigation with Visual Browsing and Search," In Proceedings of the SIGCHI Conference on Human Factors in Computing Systems, 2006, 10 pages.

Yin, et al., "Dial and See—Tackling the Voice Menu Navigation Problem with Cross-Device User Experience Integration," In Proceedings of the 18th Annual ACM Symposium on User Interface Software and Technology, 2005, 4 pages.

Yin, et al., "Phone n' Computer: teaming up an information appliance with a PC," In Personal and Ubiquitous Computing, vol. 14, No. 7, Oct. 2010, 7 pages.

Gunaratne, et al., "Newport: Enabling Sharing During Mobile Calls," In Proceedings of the SIGCHI Conference on Human Factors in Computing Systems, 2010, 10 pages.

"Spin, HD Mobile Video Communications Experience with Video & Photo Sharing," available at <<http://getspin.com/>>, retrieved on Dec. 9, 2013, Net Power and Light, Inc., 8 pages.

"Thrutu, changing the conversation," available at <<http://thrutu.com/about-thrutu/>>, accessed on Apr. 3, 2014, Metaswitch Networks, London, UK, 1 page.

Non-Final Office Action dated Mar. 8, 2012 from U.S. Appl. No. 12/819,245, 22 pages.

Response filed Jun. 29, 2012 to the Non-Final Office Action dated Mar. 8, 2012 from U.S. Appl. No. 12/819,245, 13 pages.

Final Office Action dated Oct. 12, 2012 from U.S. Appl. No. 12/819,245, 26 pages.

Applicant-Initiated Interview Summary dated Jan. 2, 2013 from U.S. Appl. No. 12/819,245, 3 pages.

Response filed Jan. 14, 2013 to the Final Office Action dated Oct. 12, 2012 from U.S. Appl. No. 12/819,245, 13 pages.

Non-Final Office Action dated Dec. 13, 2013 from U.S. Appl. No. 12/819,245, 7 pages.

Response filed Mar. 25, 2014 to the Non-Final Office Action dated Dec. 13, 2013 from U.S. Appl. No. 12/819,245, 13 pages.

Notice of Allowance dated Apr. 24, 2014 from U.S. Appl. No. 12/819,245, 8 pages.

Vasile, Cosmin, "Display Your Symbian Phone Screen on a PC," published Feb. 17, 2009, retrieved at <<http://news.softpedia.com/news/Display-Your-Symbian-Phone-Screen-on-a-PC-104756.shtml>> on Feb. 24, 2010, 3 pages.

"MyMobiler v1.25," published Feb. 7, 2008, retrieved at <<http://www.mymobiler.com/>> on Feb. 24, 2010, 1 page.

"Remote Control Windows Mobile Phone From Desktop Computer," published Oct. 21, 2007, retrieved at <<http://www.labnol.org/gadgets/phones/remote-control-mobile-phone-desktop-computer/1677/>> on Feb. 24, 2010, 1 page.

Auletta et al., "Performance Evaluation of Web Services Invocation over Bluetooth," Proceedings of the ACM International Workshop on Performance Monitoring, Measurement, and Evaluation of Heterogeneous Wireless and Wired Networks (PM2HW2N '06), Oct. 2, 2006, pp. 1-8, 8 pages.

Barkhuus et al., "From Awareness to Repartee: Sharing Location within Social Groups," CHI 2008 Proceedings, Apr. 5-10, 2008, pp. 497-506, 10 pages.

Berry et al., "Role-Based Control of Shared Application Views," Proceedings of the 18th Annual ACM Symposium on User Interface Software and Technology (UIST), Oct. 23-27, 2005, pp. 23-32, 10 pages.

Boyaci, Omer and Henning Schulzrinne, "Application and Desktop Sharing," International Conference on Emerging Networking Experi-

(56) References Cited

OTHER PUBLICATIONS ments and Technologies, Proceedings of the 2007 ACM CoNEXT Conference, Dec. 10-13, 2007, 2 pages.
Churchill et al., "Multimedia Fliers: Information Sharing with Digital Community Bulletin Boards," Proceedings of the First International Conference on Communities and Technologies (C&T 2003), Aug. 31, 2003, pp. 97-117, 20 pages.
Congleton et al., "The ProD Framework for Proactive Displays," Proceedings of the 21st Annual ACM Symposium on User Interface Software and Technology (UIST'08), Oct. 19-22, 2008, pp. 221-230, 10 pages.
Consolvo et al., "Location Disclosure to Social Relations: Why, When, & What People Want to Share," Conference on Human Factors in Computing Systems, CHI 2005, Apr. 2-7, 2005, pp. 81-90, 10 pages.
Deosthali, Ajit, "Worldwide Bluetooth Semiconductor 2008-2012 Forecast," Nov. 2008, retrieved at << http://www.idc.com/getdoc.jsp?containerId=214945 >> on Feb. 24, 2010, 2 pages.
Enck et al., "Exploiting Open Functionality in SMS-Capable Cellular Networks," Proceedings of the 12th ACM Conference on Computer and Communications Security (CCS 2005), Nov. 7-11, 2005, 12 pages.
Stevens et al., "Gartner Says Worldwide Smartphone Sales Grew 16 Per Cent in Second Quarter of 2008," Sep. 8, 2008, retrieved at << http://www.gartner.com/it/page.jsp?id=754112 >> on Feb. 24, 2010, 3 pages.
Garriss et al., "Trustworthy and Personalized Computing on Public Kiosks," Proceeding of the 6th International Conference on Mobile Systems, Applications, and Services (MobiSys 2008), Jun. 17-20, 2008, 12 pages.
Huang et al., "Kimono: Kiosk-Mobile Phone Knowledge Sharing System," Proceedings of MUM 2005, vol. 154, Dec. 8-10, 2005, 8 pages.
Karlson et al., "Courier: A Collaborative Phone-Based File Exchange System," retrieved at << http://research.microsoft.com/pubs/56154/tr-2008-05.pdf >>, Microsoft ResearchTechnical Report, MSR-TR-2008-05, Jan. 2008, 17 pages.
Kun et al., "Co-Present Photo Sharing on Mobile Devices," Proceedings of the 9th Conference on Human-Computer Interaction with Mobile Devices and Services, (MobileHCI2007), Sep. 9-12, 2007, 8 pages.
Madhavapeddy et al., "Audio Networking: The Forgotten Wireless Technology," IEEE Pervasive Computing, vol. 4, No. 3, Jul. 2005, 1 page.
Paek et al., "Toward Universal Mobile Interaction for Shared Displays," Proceedings of the 2004 ACM Conference on Computer Supported Cooperative Work (CSCW'04), Nov. 6-10, 2004, 4 pages.
Sadun, Erica, "Consumers, not providers, ready for ubiquitous cellular data," published Mar. 1, 2009, retrieved at <<http://arstechnica.com/telecom/news/2009/03/going-ubiquitous-with-cellular-data.ars >> on Feb. 24, 2010, 1 page.
Sarvas et al., "Building Social Discourse Around Mobile Photos—A Systemic Perspective," Mobile HCI'05, Sep. 19-22, 2005, pp. 31-38, 8 pages.
Sellen et al., "The Whereabouts Clock: Early Testing of a Situated Awareness Device," CHI 2006 extended abstracts on Human factors in Computing Systems, Apr. 22-27, 2006, 6 pages.
Response and Demand under Article 31 filed Oct. 20, 2015 from PCT Application No. PCT/US2015/022877, 18 pages.
Amendment filed Mar. 7, 2017 for Chinese Patent Application No. 201580017852.4, 24 pages.
Amendment filed May 8, 2017 for European Patent Application No. 15719883.9, 18 pages.
"Office Action Issued in Chinese Patent Application No. 201580017852.4", dated Jan. 30, 2019, 15 Pages.

\* cited by examiner

PROVIDING A SHARED USER EXPERIENCE OF FACILITATE COMMUNICATION

BACKGROUND

In the course of a telephonic or text-based conversation, a first user may wish to direct a second user's attention to a resource-of-interest, such as an identified website. To perform this task, the first user may explain to the second user how he or she may access the resource-of-interest, e.g., by verbalizing the spelling of the Uniform Resource Locator (URL) of the resource-of-interest. Once the second user accesses the resource-of-interest, the first user may then attempt to direct the second user's attention to a particular portion of the resource-of-interest. The first user may accomplish this goal in any ad hoc manner, such as by verbally guiding the user to a particular part of the resource-of-interest. The above-described approach, however, is time-consuming, prone to error, and cumbersome.

SUMMARY

A communication augmentation agent (CAA) is described herein which offers a shared user experience to at least a first user and a second user in the course of a conversation between the users, or in circumstances that are conducive to such a conversation. The CAA performs this task without unduly inconveniencing the users. Once invoked, the shared user experience facilitates communication among the users.

In one non-limiting implementation, the CAA includes a setup component for selecting the shared user experience. The setup component, in turn, may include a trigger component, a resource selection component, and a delivery selection component. The trigger component determines when to offer the shared user experience to the first user and the second user. The resource selection component determines a particular shared resource (or plural shared resources) to be shared by the first user and the second user. And the delivery selection component determines a mode for delivering the particular shared resource(s) to the first user and the second user.

The CAA further includes a notification component that notifies at least one of the first user and/or the second user of the existence of the particular shared resource(s), inviting them to interact with that resource. Finally, the CAA includes a delivery management component that manages delivery of the particular shared resource(s) to the first user and the second user, in a manner conforming to the determined delivery mode.

According to another illustrative aspect, the trigger component (which is part of the setup component) can determine when to offer a particular shared resource by making two or more individual trigger-determinations. The two or more trigger-determinations may be selected from among: a determination that the first user and the second user are engaged in a conversation; a determination that the first user and the second user are engaged in a common activity (beyond that of a communication activity); a determination that one or more behavioral patterns associated with the first user and/or the second user suggests the appropriateness of establishing an interactive session between the first user and the second user; and/or a determination that the first user and the second user are operating within respective environments having at least one common characteristic, etc.

According to another illustrative aspect, the resource selection component customizes a selected resource to provide the particular shared resource. More specifically, the resource selection component can: determine common-interest information that is relevant to the first user and the second user; determine first-user information that is relevant to the first user, but not necessarily the second user; determine second-user information that is relevant to the second user, but not necessarily the first user; customize a first instance of the shared resource, for delivery to the first user, to include the common-interest information and the first-user information; and customize a second instance of the shared resource, for delivery to the second user, to include the common-interest information and the second-user information.

According to another illustrative aspect, the CAA includes a registration component for determining whether the first user is registered with the CAA but the second user is not registered with the CAA. If so, the registration component provides a mechanism by which the registered user may invite the unregistered user to register with the CAA.

The above approach can be manifested in various types of systems, devices, components, methods, computer readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 13 shows a shared resource from the vantage point of a first user, while FIG. 14 shows the shared resource from the vantage point of a second user.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative communication augmentation agent (CAA) for providing a shared user experience to two or more users. Sections B-F describe respective components of the CAA, including a trigger component, a resource selection component, a participant identification component, a delivery selection component, and a registration component. Section G describes illustrative computing functionality that can be used to implement any aspect of the features described in the preceding sections.

Figure 22:
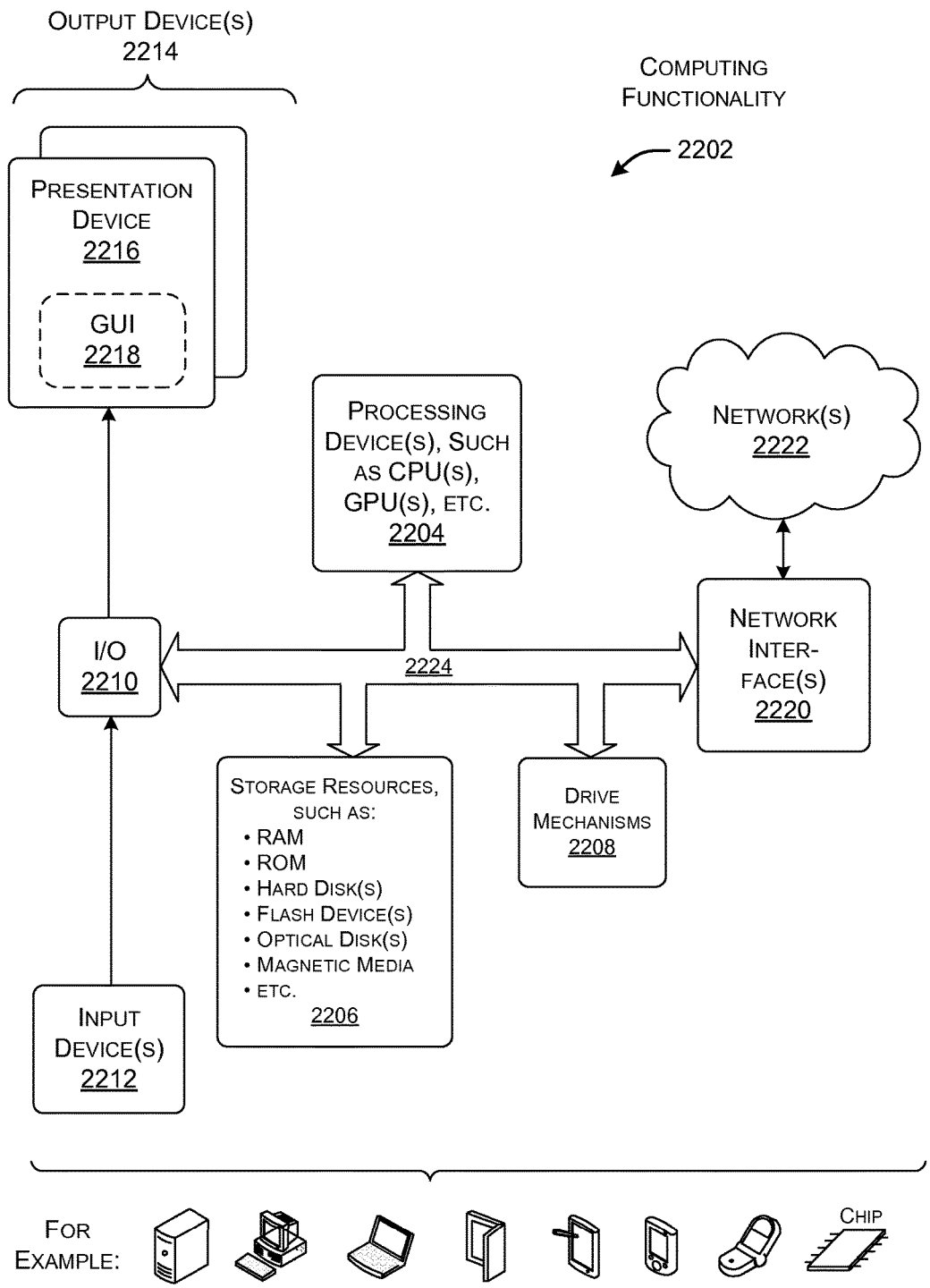
FIG. 22 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software running on computer equipment, hardware (e.g., chip-implemented logic functionality), etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 22, to be described in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software running on computer equipment, hardware (e.g., chip-implemented logic functionality), etc., and/or any combination thereof.

As to terminology, the phrase "configured to" encompasses any way that any kind of physical and tangible functionality can be constructed to perform an identified operation. The functionality can be configured to perform an operation using, for instance, software running on computer equipment, hardware (e.g., chip-implemented logic functionality), etc., and/or any combination thereof.

The term "logic" encompasses any physical and tangible functionality for performing a task. For instance, each operation illustrated in the flowcharts corresponds to a logic component for performing that operation. An operation can be performed using, for instance, software running on computer equipment, hardware (e.g., chip-implemented logic functionality), etc., and/or any combination thereof. When implemented by computing equipment, a logic component represents an electrical component that is a physical part of the computing system, however implemented.

The following explanation may identify one or more features as "optional." This type of statement is not to be interpreted as an exhaustive indication of features that may be considered optional; that is, other features can be considered as optional, although not expressly identified in the text. Further, any description of a single entity is not intended to preclude the use of plural such entities; similarly, a description of plural entities is not intended to preclude the use of a single entity. Finally, the terms "exemplary" or "illustrative" refer to one implementation among potentially many implementations.

A. Overview of a Communication Augmentation Agent (CAA)

Figure 1:
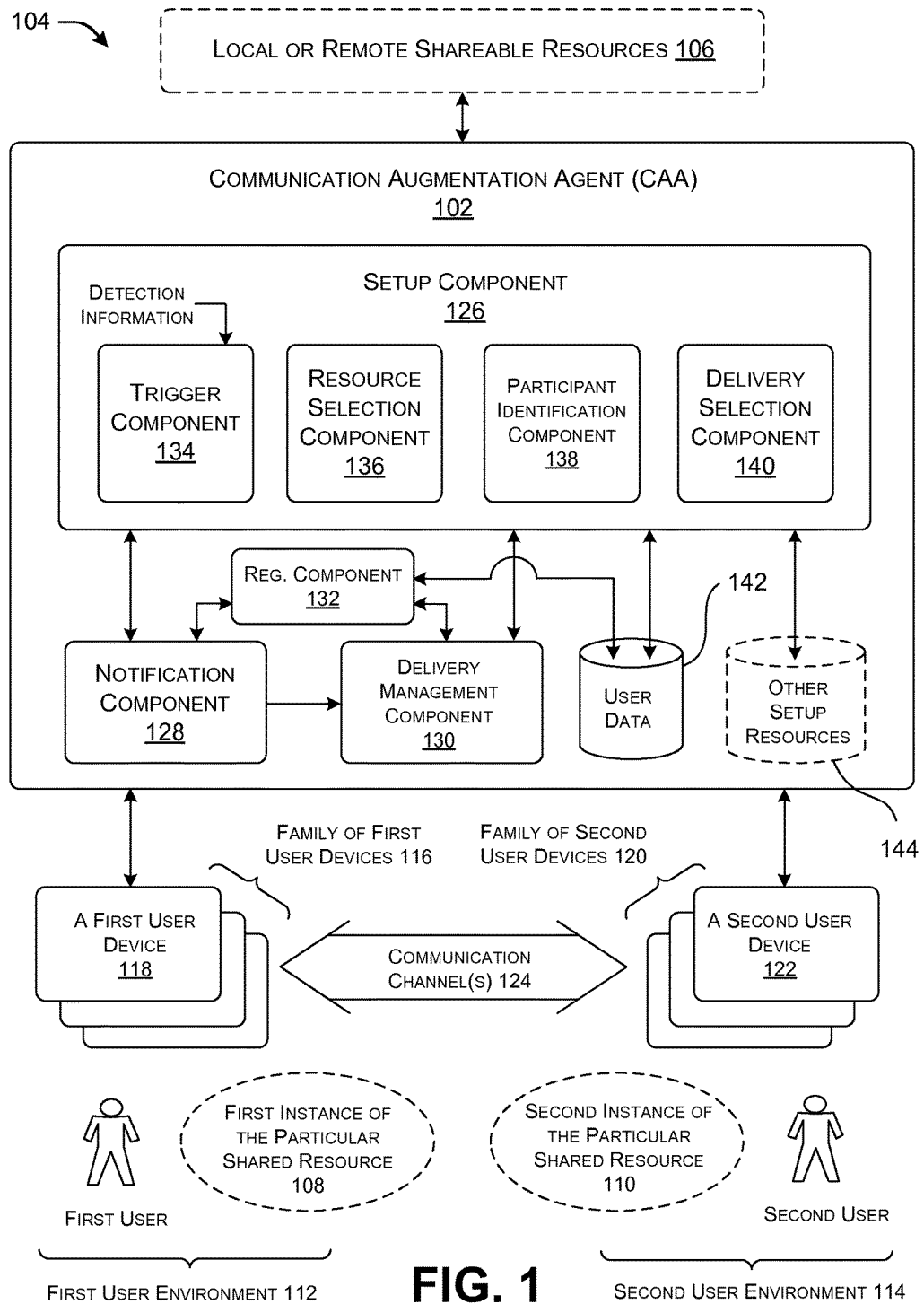
FIG. 1 shows a logical depiction of a communication augmentation agent (CAA) for providing a shared user experience to two or more users.

FIG. 1 shows a logical depiction of a communication augmentation agent (CAA) 102 that operates within an environment 104. From a high-level perspective, the CAA 102 monitors the actual or potential communication between users within the environment 104. At an appropriate juncture, the CAA 102 offers at least one shared resource to the users, selected from a collection of local and/or remote shareable resources 106. The CAA 102 then delivers the shared resource to the users upon their acceptance of the offer. The users' subsequent interaction with the shared resource augments and facilitates communication between the users. Overall, the CAA 102 functions as a helper agent which operates in the background of the users' conversation, seamlessly offering communicative assistance to the users without unduly inconveniencing the users.

To simplify the explanation, many of the following examples are framed in the context of two representative users, e.g., the first user and second user shown in FIG. 1. But, more generally, the CAA 102 can deliver the shared resource to any number of users, including more than two users. Likewise, to further simplify the explanation, many of the following examples will assume that the CAA 102 offers a single shared resource to the users. But in other cases, the CAA 102 can offer two or more shared resources to the users.

A shared resource corresponds to any information, application, website, service, etc. to which the users may make reference while communicating with each other. Instances of the shared resource may be remotely stored on plural user devices, and/or remotely provided by one or more server computing devices, etc. For example, the shared resource may correspond to an interactive map application with which each user may interact. More specifically, the first user interacts with a first instance 108 of the shared resource, while the second user interacts with a second instance 110 of the shared resource. Further, in at least some implementations, the actions by a user with respect to one instance of the shared resource (such as scrolling or pointing actions), are duplicated in the instance of the shared resource that is presented to the other user, such that each user largely sees what the other user sees.

More specifically, each shared resource may include a shared portion, and, optionally, a non-shared portion. The shared portion corresponds to a part of the shared resource which has the same appearance and behavior in the first and second instances of the shared resource, presented respectively to the first and second users. The non-shared portion corresponds to a part of the shared resource which does not have the same appearance and/or behavior across the first and second instances. The figures and subsequent explanation will clarify the meaning of the terms "shared" and "non-shared" portions.

Referring to the setting depicted in FIG. 1 as a whole, the first user operates in a first user environment 112, while the second user operates in a second environment 114. Each environment is characterized by the geographical locale in which a user is operating. Each environment is also characterized by the contextual setting in which the user is operating, such as whether the user is indoors, outdoors, stationary, mobile, etc. Some characteristics of the first user environment 112 may be the same as some characteristics of the second user environment 114, as when both users are in close physical proximity to one another, and/or when the users are otherwise operating in common contextual settings.

The first user may be associated with a first collection of user devices 116, including representative user device 118. Similarly, the second user may be associated with a second collection of user devices 120, including the representative user device 122. The user devices (116, 120) can correspond to any assortment of computing devices, including, but not limited to: desktop personal computing devices, laptop computing devices, netbook-type computing devices, tablet-type computing devices, game console devices, set-top boxes, smartphones (and/or other telephonic communication devices), personal digital assistant devices, portable media-consumption devices (e.g., book readers, music players, etc.), portable gaming devices, wearable computers, smart appliances and other Internet-coupled devices, and so on.

In a manner that will be explained in greater detail below, the users can use any of their user devices (116, 120) to conduct any kind of voice-based or text-based conversation, as well as to interact with the shared resources. In performing these communication tasks, the first user's user devices 116 may interact with the second user's user devices 120 via one or more communication channels 124.

The CAA 102 includes a collection of modules which perform different functional tasks. For instance, the CAA 102 can include a setup component 126 for selecting the shared user experience, which takes the form of a particular shared resource. A notification component 128 notifies at least the first user and/or the second user of the existence of the shared user experience, e.g., by inviting them to invoke the particular shared resource. A delivery management component 130 manages the delivery of the particular shared resource when each user agrees to receive it. Finally, a registration component 132 registers users with the CAA 102.

The setup component 126 itself includes, or may be conceptualized as including, plural sub-modules. In one implementation, for instance, the setup component 126 includes: a trigger component 134 for determining when to invoke a shared user experience; a resource selection component 136 for selecting a particular shared resource to be shared and/or the form of that shared resource; a participant identification component 138 for resolving the identities of the participants of the shared user experience; and a delivery selection component 140 for selecting a mode to be used to deliver the particular shared resource. Later sections provide additional information regarding the trigger component 134 (in Section B), the resource selection component 136 (in Section C), the participant identification component 138 (in Section D), the delivery selection component 140 (in Section E), and the registration component 132 (in Section F). It should be noted, however, that other embodiments of the CAA 102 may include only a subset of the components summarized above.

To perform its functions, the CAA 102 may interact with one or more data stores 142 that provide user information. The user information may include: (a) information indicating the registration status of the users; (b) information regarding communication preferences of the users; (c) information regarding user devices possessed by the users; (d) information regarding demographic characteristics of the users; (e) information regarding interests exhibited by the users, and so on. Alternatively, or in addition, some user information may be locally stored by the user devices (116, 120). As set forth in Section G, the CAA 102 may maintain appropriate safeguards when dealing with any personal user data. The setup component 126 may also interact with any other setup resources, as maintained in one or more data stores 144, when selecting a particular shared resource.

Figure 2:
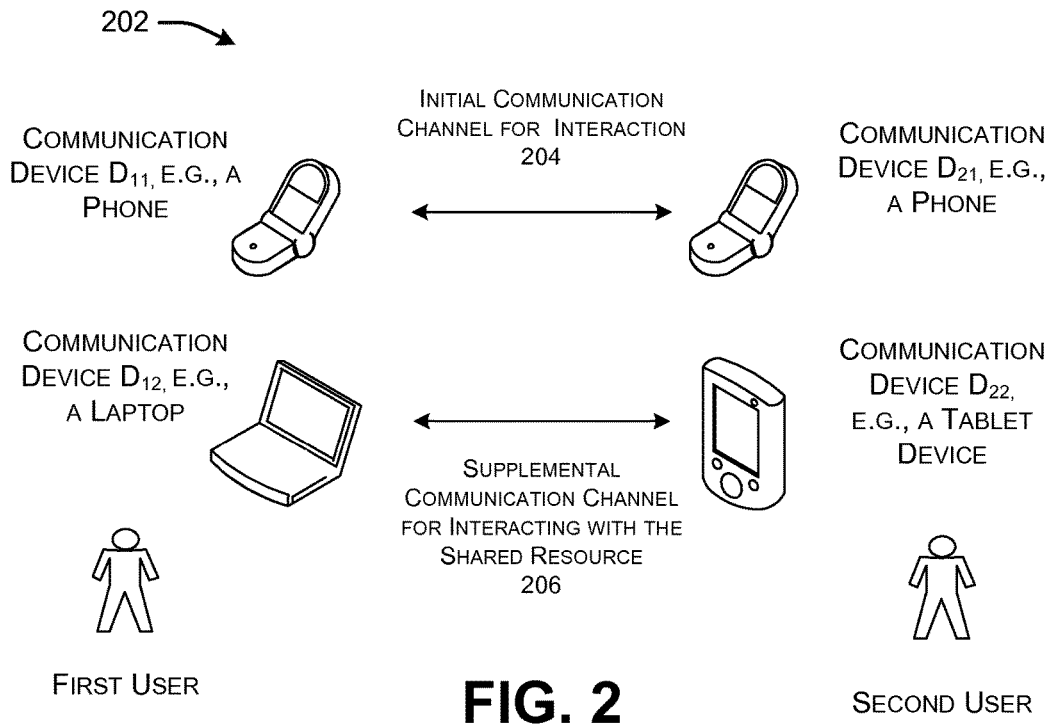
FIG. 2 shows a collection of user devices that may be used by the users to interact with the CAA of FIG. 1, according to a first example.

FIG. 2 shows a collection of user devices that may be used by the users to interact with the CAA 102 of FIG. 1, according to a first example 202. In this case, the first user and the second user first establish a voice-based or text-based communication session over a first communication channel 204. In this conversation, the first user uses a first user device $D_{11}$, while the second user uses a second user device $D_{21}$. Upon invocation of the shared user experience, the first and second users interact with a particular shared resource via a second communication channel 206. In this interaction, in this non-limiting example, the first user uses a third user device $D_{12}$, while the second user uses a fourth user device $D_{22}$. For example, without limitation, the first and second user devices ($D_{11}$, $D_{21}$) may correspond to smartphones (or other telephonic communication devices), the third user device $D_{12}$ may correspond to a laptop computing device, and the fourth user device $D_{22}$ may correspond to a tablet-type computing device.

Figure 3:
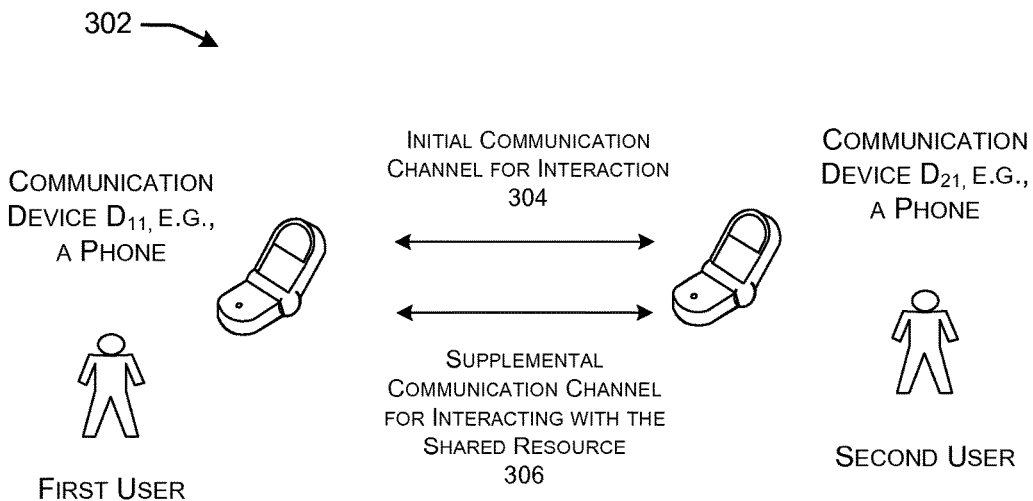
FIG. 3 shows another collection of user devices that may be used by the users to interact with the CAA of FIG. 1, according to a second example.

FIG. 3 shows another collection of user devices that may be used by the users to interact with the CAA 102 of FIG. 1, according to a second example 302. In this case, the first user and the second user first establish a voice-based or text-based communication session over a first communication channel 304. In this conversation, the first user uses a first user device $D_{11}$, while the second user uses a second user device $D_{21}$. Upon invocation of the shared user experience, the first and second users interact with a particular shared resource via a second communication channel 306. In this interaction, the users use the same user devices ($D_{11}$, $D_{21}$) that were used to carry out the initial voice-based or text-based conversation. The first and second user devices ($D_{11}$ and $D_{21}$) may again correspond to two respective smartphones (or other type of telephonic communication devices).

Other examples (not shown) represent a hybrid of the first and second examples (202, 302). That is, in these cases, at least one user may use the same device to carry out the initial conversation and to interact with the shared resource, while the other user may use different devices to respectively carry out the initial conversation and to interact with the shared resource.

Figure 4:
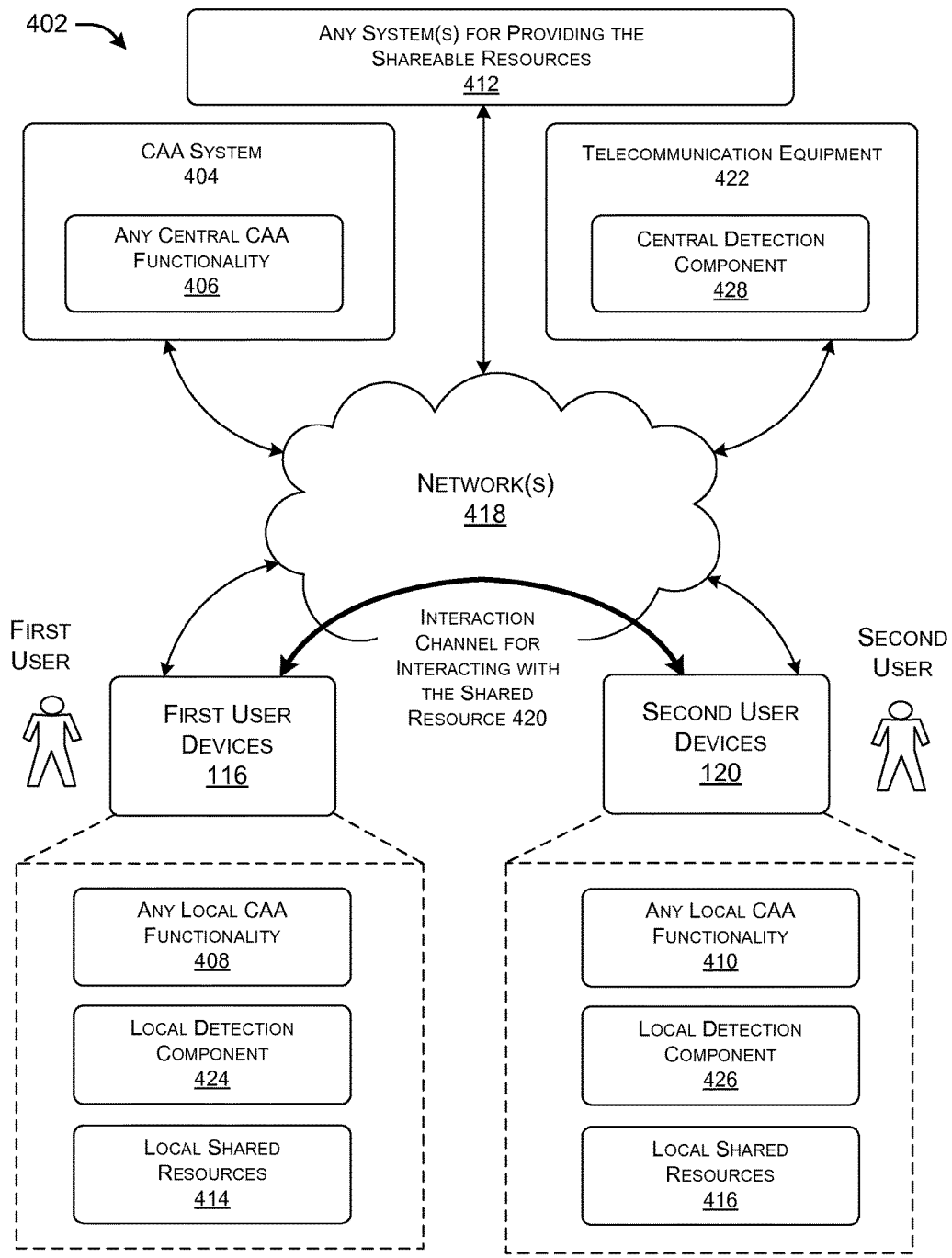
FIG. 4 shows computing equipment that may be used to implement the CAA of FIG. 1, according to one non-limiting implementation.

FIG. 4 shows computing equipment 402 that may be used to implement the CAA 102 of FIG. 1, according to one non-limiting implementation. A CAA system 404 may include central CAA functionality 406 for implementing at least some aspects of the CAA 102 of FIG. 1. In addition, or alternatively, one or more of the first user devices 116 and one or more of the second user devices 120 may include local instances of CAA functionality (408, 410) for implementing at least some aspects of the CAA 102 of FIG. 1. For example, in one implementation, the CAA system 404 implements all aspects of the CAA 102 of FIG. 1, without reliance on the local instances of the CAA functionality (408, 410). In another case, the user devices implement all aspects of the CAA 102 of FIG. 1, without reliance on the central CAA functionality 406. In still other cases, the operations of the CAA 102 are distributed among the central CAA functionality 406 and the local instances of the CAA functionality (408, 410). The CAA system 404 can be implemented as one or more server computing devices and associated data stores, provided at a single location or distributed over two or more locations.

The equipment 402 further includes two or more systems 412 for implementing at least some of the shared resources. For example, assume that a particular shared resource corresponds to an interactive map application. The systems 412 provide the functionality (e.g., program code) which implements the map application. In one case, the systems 412 may be implemented as one or more server computing devices and associated data stores, provided at a single location or distributed over two or more locations. Alternatively, or in addition, at least some of the shared resources (414, 416) may represent information and/or applications stored on the local user devices (116, 120). For example, the interactive map application may instead represent code stored on at least one user device associated with the first user, and on at least one user device associated with the second user.

One or more networks 418 implement one or more communication channels between the first user devices 116 and the second user devices 120. For example, the networks 418 can include any local area computer network, any wide area computer network (e.g., the Internet), any point-to-point links, any telecommunication infrastructure (e.g., a cellular telecommunication network), and so on, or any combination thereof. In one case, the CAA 102 establishes a peer-to-peer interaction channel 420 by which the users may interact with the shared resource.

In some implementations, telecommunications equipment 422 provided by one or more telecommunication providers may play a role in the interaction between the first user devices 116 and the second user devices 120. In part, the telecommunications equipment 422 may include one or more server computing devices maintained by the telecommunication providers, and associated data stores. The server computing devices and data stores may be provided at a single site or distributed over two or more sites.

The computing equipment 402 may further include one or more detection components for detecting when the first user is engaged in a conversation with the second user, e.g., via a voice channel, text-based channel, etc. In one case, the local user devices (116, 120) perform this detection function. That is, one or more of the first user devices 116 include a local detection component 424 for determining when the first user is engaged in a conversation with the second user, and one or more of the second user devices 120 include a local detection component 426 for determining when the second user is engaged in a conversation with the first user. In addition, or alternatively, the telecommunications equipment 422 may include a central detection component 428 for determining when a conversation is taking place between the first user and the second user. The detection components (424, 426, 428) operate by detecting communication events which are received and/or sent by the user devices (116, 120), such as communication start messages, communication end messages, SMS messages, etc.

Figure 5:
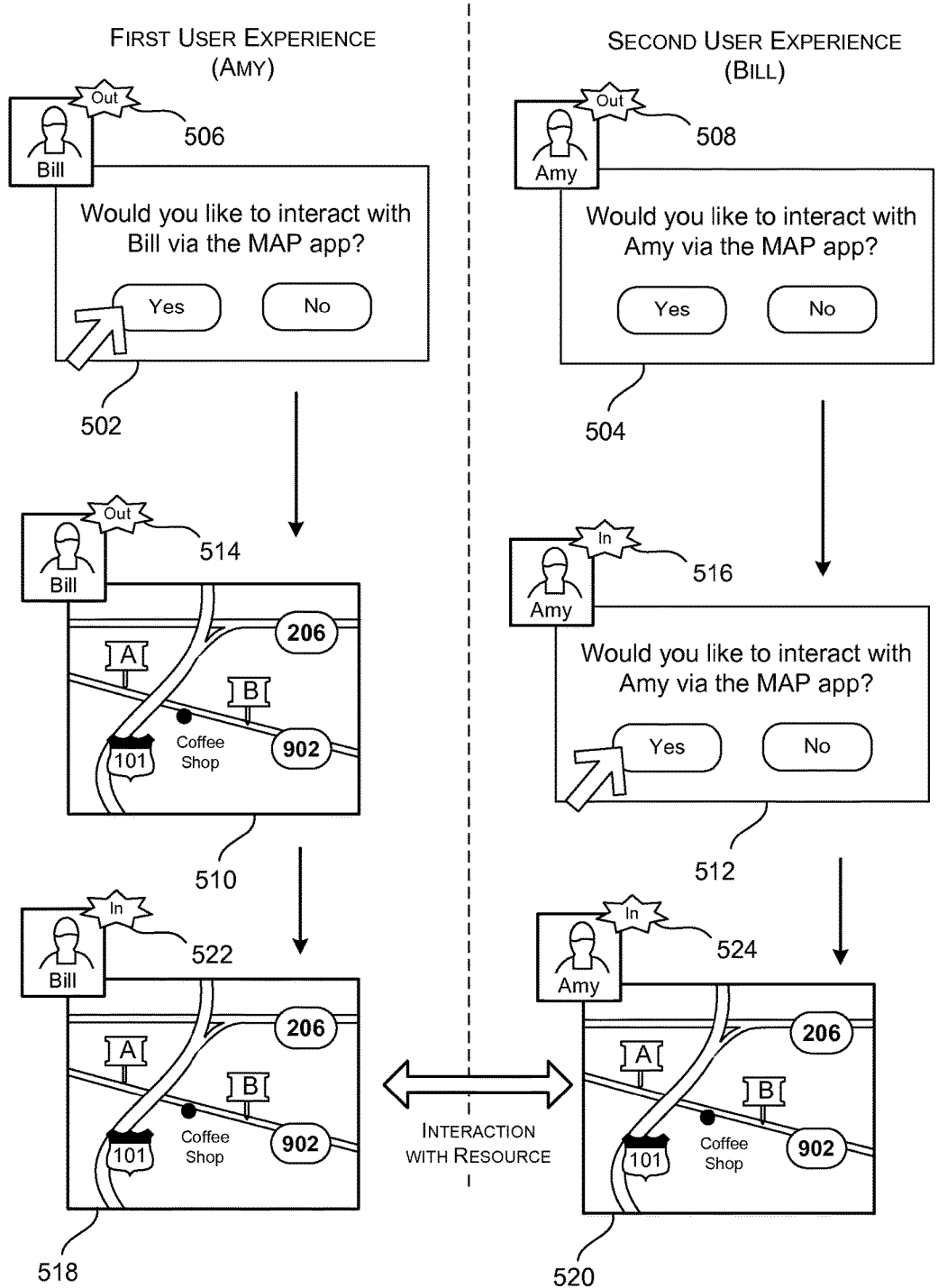
FIG. 5 shows a user experience offered by the CAA of FIG. 1, from the vantage point of two users.

FIG. 5 shows a user experience offered by the CAA 102 of FIG. 1, from the vantage point of two users. The first user is a person named Amy, while the second user is a person named Bill. Assume, in this example, that both Amy and Bill are registered to interact with the CAA 102.

Assume that the setup component 126 detects that Amy is engaged in a conversation with Bill. That is, assume that Amy uses any one or her user devices (such as a smartphone) to talk to Bill, and Bill uses any one of his user devices (such as a smartphone) to talk to Amy. In response, the setup component 126 decides to offer an interactive map application to these users to facilitate their communication. Amy uses any one of her user devices to interact with a first instance of the map application, while Bill uses any one of his user devices to interact with a second instance of the map application. In terminology used above, the interactive map application constitutes an example of a particular shared resource.

As a first operation, the notification component 128 sends a first notification 502 to Amy and a second notification 504 to Bill. The first notification 502 invites Amy to establish a shared user experience with Bill, while the second notification 504 invites Bill to establish a shared user experience with Amy. In one case, Amy and Bill receive these notifications (502, 504) on the same user devices that they have been using to carry out their existing conversation. In another case, Amy and Bill receive these notifications (502, 504) on other user devices, e.g., corresponding to the devices that will host the shared user experience. Another case is a hybrid between the first and second scenarios just described, e.g., in which Amy receives her notification 502 on the same user device that she is using to talk with Bill, but Bill receives his notification 504 on a different user device compared to that which he uses to talk to Amy (or vice versa).

Each notification includes an indicator which indicates the attendance-related status of the other user, e.g., indicating whether the other person is currently interacting with the shared resource at the present time. For example, the notification 502 presented to Amy includes an indicator 506 which indicates that Bill has not yet joined the interactive session, and the notification 504 presented to Bill includes an indicator 508 which indicates that Amy has not yet joined the interactive session.

Assume at this juncture that Amy selects the "Yes" control in her notification 502, but that Bill hesitates to similarly join the interactive session. In response, the delivery management component 130 of the CAA 102 delivers an instance

510 of the interactive map application to Amy, and the notification component 128 provides an updated notification 512 to Bill. The instance 510 of the interactive map application includes a map that shows the respective locations of Amy and Bill (e.g., corresponding to the pins labeled "A" and "B"). The instance 510 of the interactive map application is also accompanied by an indicator 514 which conveys that Bill has not yet joined the interactive session. On the other hand, the updated notification 512 presented to Bill now includes an indicator 516 that conveys that Amy has now joined the interactive session.

Assume at this juncture that Bill also selects the "Yes" control on the updated notification 512. In response, the CAA 102 delivers the interactive map application to both Amy and Bill. That is, the CAA 102 presents a first instance 518 of the interactive map application to Amy and a second instance 520 of the interactive map application to Bill. This interactive map application constitutes a shared user experience because at least a part of the interface presentation provided by the map application appears and behaves the same across both instances (518, 520) of the application. At this stage, the indicators (522, 524) respectively associated with the first and second instances (518, 520) convey that both Amy and Bill are currently interacting with the shared resource.

Figure 6:
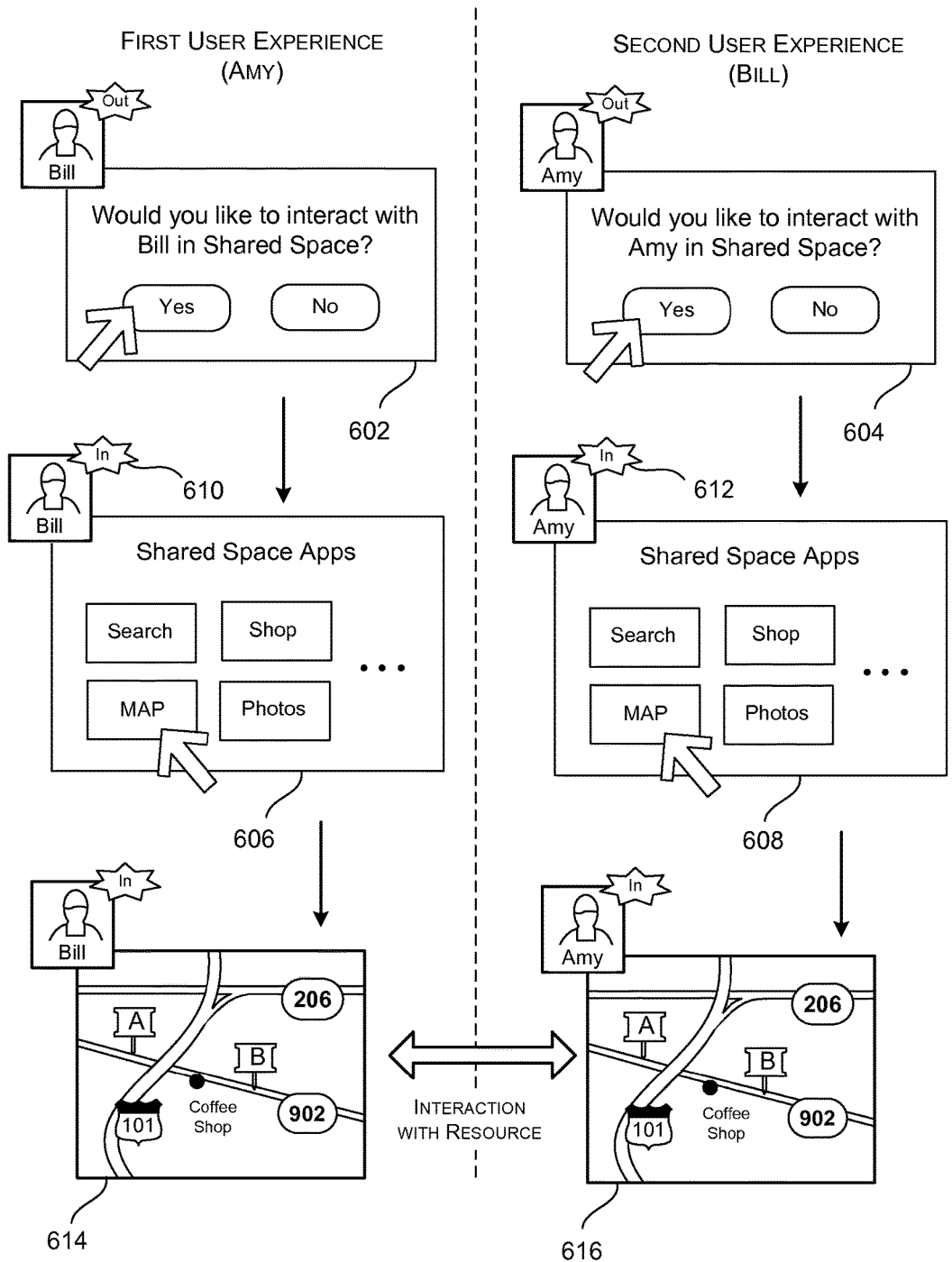
FIG. 6 shows another user experience offered by the CAA of FIG. 1.

FIG. 6 shows another user experience offered by the CAA 102, representing a variation of the user experience described above with respect to FIG. 5. In this case, the notification component 128 sends respective notifications (602, 604) to Amy and Bill in the same manner described above. Assume that both Amy and Bill accept the shared user experience, e.g., by selecting the "Yes" controls in the respective notifications (602, 604).

At this stage, the delivery management component 130 provides a shared resource to the users, where that resource now constitutes a portal through which the users may select other shared resources. The portal is referred to in FIG. 6 as a shared space. More specifically, the CAA 102 presents a first instance 606 of the shared space to Amy and a second instance 608 of the shared space to Bill. Each instance of the shared space shows a collection of applications that may be selected, each of which invokes a particular shared resource. The collection of applications in the first instance 606 may match the collection of applications in the second instance 608. At this stage, the indicators (610, 612) convey that both Amy and Bill are engaging the shared resource, namely, the shared space.

Assume, at this juncture, that either Amy or Bill selects the "MAP" application in the shared space. In response, the delivery management component 130 of the CAA 102 invokes the interactive map application described above. That is, the CAA 102 presents a first instance 614 of the interactive map application to Amy and a second instance 616 of the interactive map application to Bill.

The process flows illustrated in FIGS. 5 and 6 are described by way of example, not limitation. The CAA 102 can initiate a shared user experience using yet other sequences of user interface presentations. Likewise, all aspects of the visual appearance of these presentations are described by way of example, not limitation.

For example, in another case, one of the users (e.g., Bill) can enter the shared space prior to the other user. Bill can then launch a particular shared resource in the shared space, such as the map application. In response, the notification component 128 can send an updated notification to the other user (e.g., Amy), inviting Amy to join Bill in the map application. In other words, the notification that Amy receives would change from a generic invitation to join Bill in the shared space, to a more specific invitation to join Bill in the map application.

Figure 7:
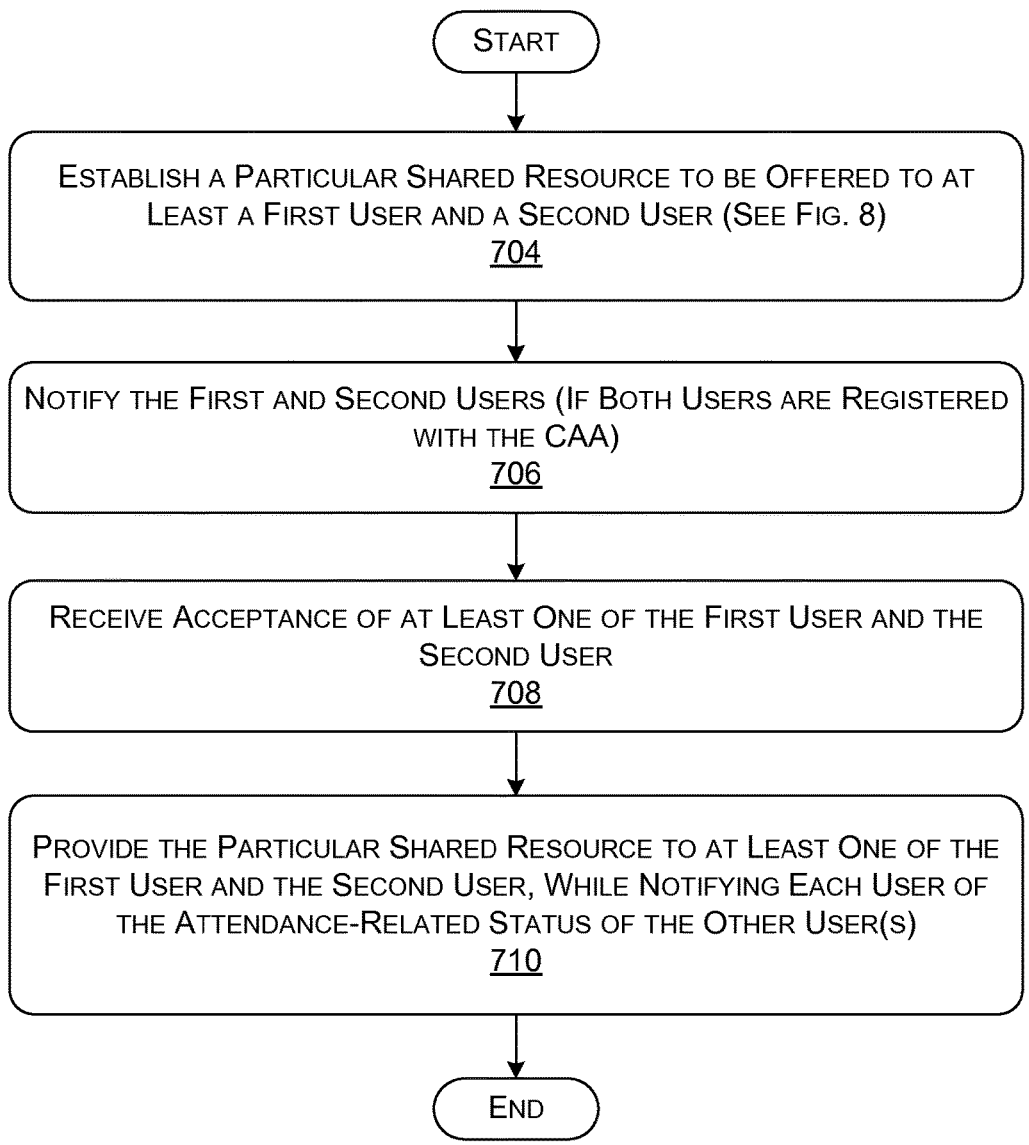
FIG. 7 shows a procedure which explains one manner of operation of the CAA of FIG. 1.

FIG. 7 shows a procedure 702 which summarizes one manner of operation of the CAA 102 of FIG. 1 in flowchart form. In block 704, the setup component 126 establishes various aspects of a particular shared experience to be offered to at least the first user and the second user, including establishing when to share, what to share, and how to share. Block 704 is summarized, below, in FIG. 8. In block 706, the notification component 128 notifies the first and second users of the existence of the shared resource, inviting these users to interact with the resource. This assumes that both the first user and the second user are already registered to interact with the CAA 102. (Section F describes how the CAA 102 handles the situation in which either the first user or the second user is not registered to interact with the CAA 102.) In block 708, the notification component 128 receives an acceptance by at least one of the users, e.g., when that user selects the "Yes" control associated with a notification. In block 710, the delivery management component 130 provides the particular shared resource to any user who has opted to receive it. At all stages, the notification component 128 provides indicators to each user, conveying the attendance-related status of the other user(s), e.g., indicating whether the other user(s) are currently interacting with the shared resource.

Figure 8:
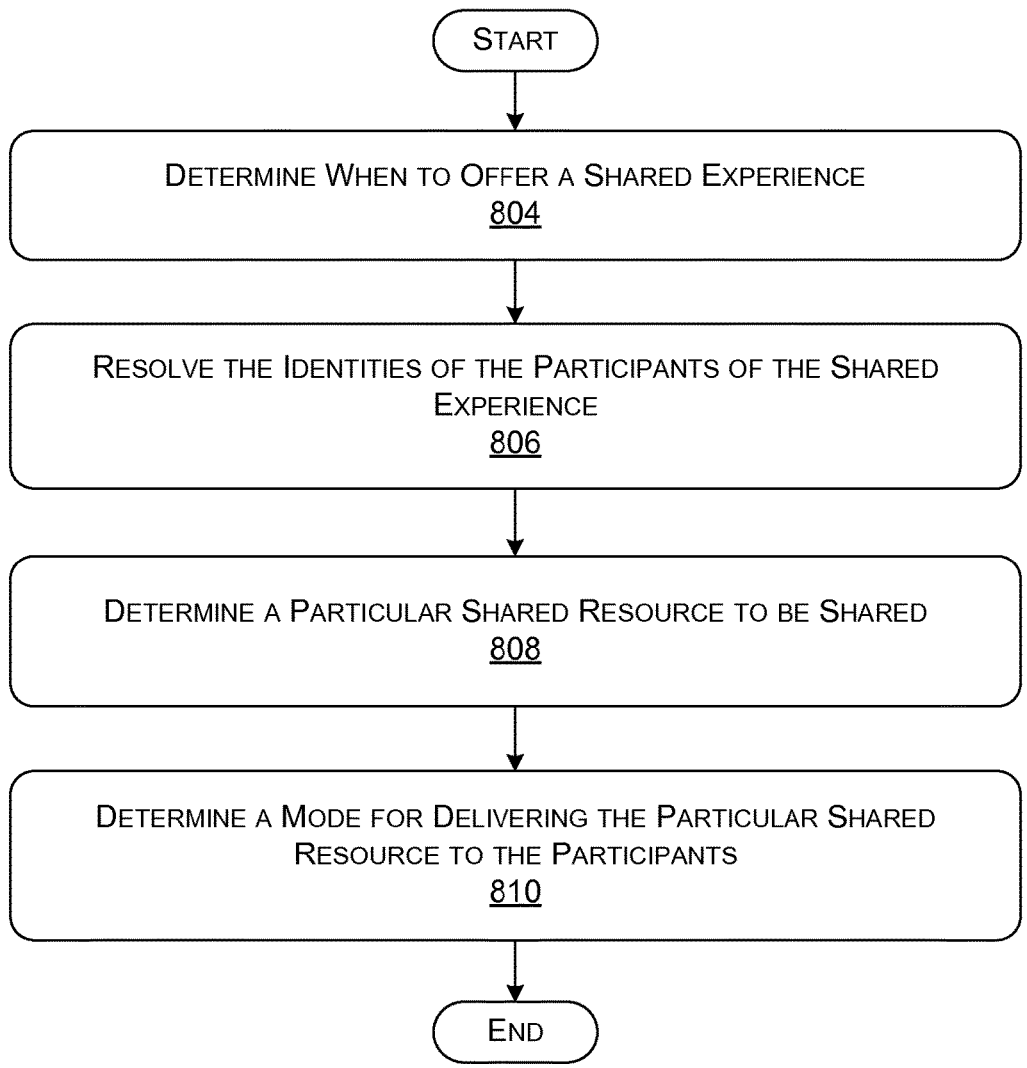
FIG. 8 shows a procedure which explains one manner of operation of a setup component, which is a module within the CAA of FIG. 1.

FIG. 8 shows a procedure 802 which summarizes one manner of operation of a setup component 126, which is a module within the CAA 102 of FIG. 1. In block 804, the trigger component 134 identifies when to invoke a shared user experience. In block 806, the participant identification component 138 resolves the identities of the first and second users. In block 808, the resource selection component 136 determines a particular shared resource to be shared between the first and second user. Block 808 may entail receiving a selection of the shared resource from a user. In addition, in some cases, block 808 may include customization of the shared resource based on one or more factors. In block 810, the delivery selection component 140 determines a mode for delivering the particular shared resource to the first and second users. In other implementations, the setup component 126 can omit one or more of the operations identified in FIG. 8.

B. Trigger Component

Figure 9:
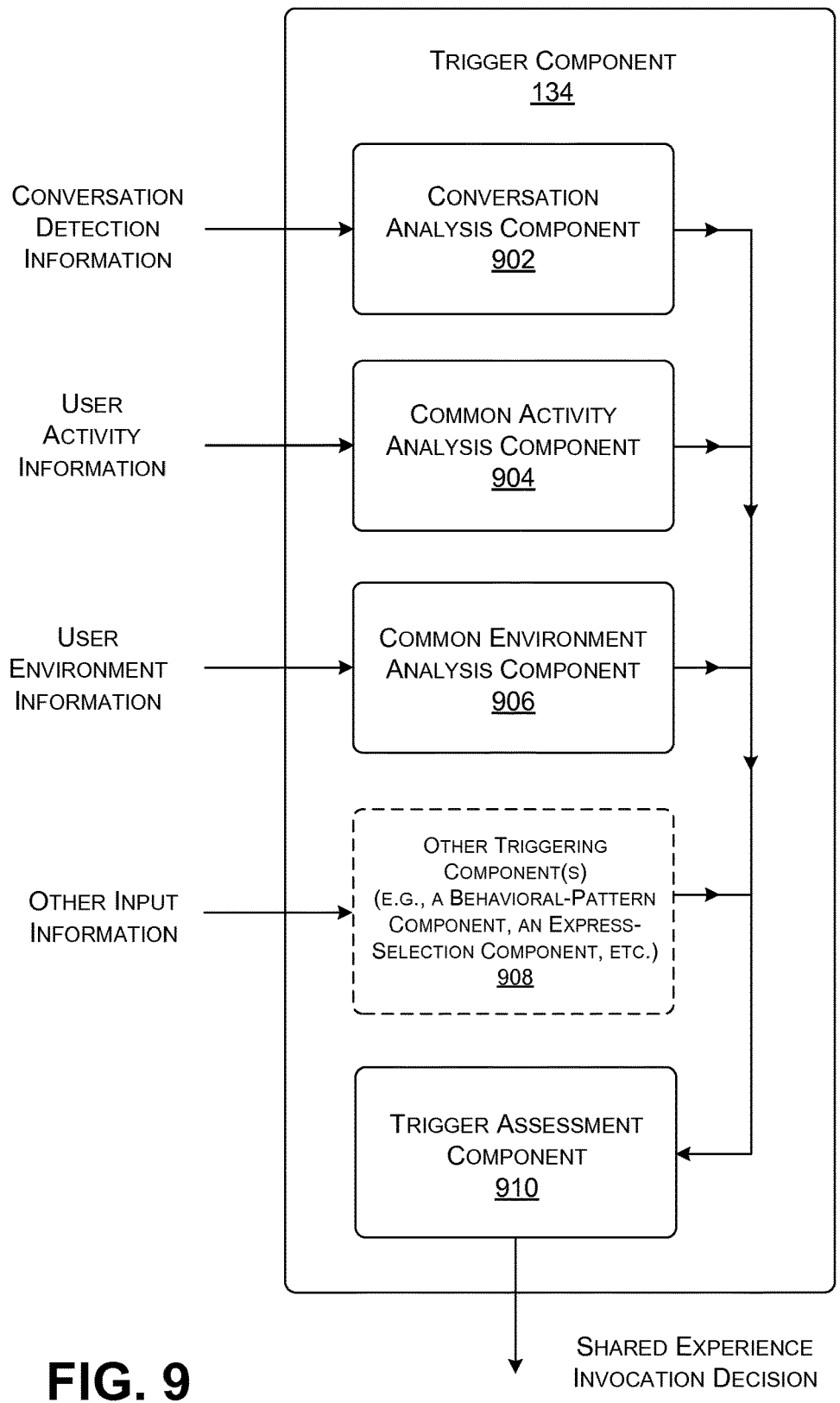
FIG. 9 shows one implementation of a trigger component, which is a module within the setup component of FIG. 1.

FIG. 9 shows one implementation of the trigger component 134, which is a module within the setup component 126 of FIG. 1. From a high-level perspective, the trigger component 134 determines when to invoke a shared user experience. To perform this task, the trigger component 134 can make one or more trigger-determinations. Individual sub-components of the trigger component 134 perform the respective trigger-determinations.

For instance, a conversation analysis component 902 determines whether the users are currently engaged in a voice-based, text-based, or other type of conversation. To perform this task, the conversation analysis component 902 receives detection information from any of the detection components (e.g., 424, 426, 428) described in the context of FIG. 4.

More specifically, the conversation analysis component 902 can detect both synchronous and asynchronous communication sessions. A synchronous communication session is characterized by a continuous flow of information among the conversation participants. One example of a synchronous conversation includes a voice-based telephone conversation. An asynchronous communication session is characterized by a series of discrete message exchanges, separated by spans in which one or more users may not be actively engaged in the conversation. An example of an asynchronous conversation includes the exchange of text-based messages (e.g., via SMS, instant messaging, Email, social network postings, blog entries, etc.), where such messages have some overarching relationship to each other.

The conversion analysis component 902 can perform different types of analyses for different types of conversations. For example, for a synchronous voice-based conversation, the conversation analysis component 902 can determine whether a conversation start event has been received, without yet receiving a corresponding conversion end event. If so, the conversation analysis component 902 can conclude that a conversation is currently active.

For an asynchronous text-based or voice-based exchange of messages, the conversation analysis component 902 can determine whether a first user has sent a message to a second user, followed by a reply by the second user, all within a prescribed period of time. If so, the conversation analysis component 902 indicates that a conversation is taking place. In other cases, the conversation analysis component 902 can determine whether the frequency of messages that are exchanged among two or more people exceeds an application-specific threshold. In other words, the conversation analysis component 902 can determine whether a series of messages forms a cluster in the temporal domain. If so, the conversation analysis component 902 can again conclude that a conversation is currently active. The conversation analysis component 902 can conclude that an asynchronous communication session has ended when the frequency of exchanged messages no longer satisfies the application-specific threshold.

The remaining analysis components of the trigger component 134, described below, more broadly determine whether conditions exist which indicate that two or more users may benefit from the presentation of a shared resource. In other words, these analysis components may determine whether circumstances exists which are conducive to communication among the users, although that communication may not have started yet.

For example, a common activity analysis component 904 determines whether the users are engaged in a common activity (that it, other than the common activity of communicating with each other). In one case, for example, the common activity analysis component 904 may receive (with permission from the users) user activity information which reflects the local and/or online resources which the users are currently consuming. The common activity analysis component 904 can determine that the users are engaged in a common activity when these users are viewing at least one local and/or online resource at the same time. For example, two users may be engaged in a common activity when they are separately interacting with the same local application installed on their respective user devices, or separately reading the same website, etc. In other cases, the common activity analysis component 904 can more generally determine that two users are engaged in a common activity when they appear to be consuming the same type of resources at generally the same time.

A common environment analysis component 906 determines whether two or more users are present in the same environment. To perform this task, the common environment analysis component 906 receives user environment information from one or more environment-sensing systems. The environment-sensing systems can include location-determination services (such as GPS systems, triangulation systems, dead reckoning systems, etc.) which identify the location coordinates of each user, within some system-specific degree of error. The environment-sensing systems may also include co-location-determining systems which determine whether the two or more users are present in the same region, without necessarily determining the exact locations of the users. For example, a co-location-determining system may leverage a wireless access point or Bluetooth® signal source, etc. to determine whether users are located in a particular region; that is, users are presumed to be in proximity to the wireless access point or the Bluetooth® signal source if their respective user devices can successively communicate with the wireless access point or Bluetooth® signal source. In another co-location-determining system, a first user device may directly sense the proximity of another user device using any signaling between the devices. In other cases, the environment-sensing systems can provide information which more generally reflects the physical circumstance which impacts each user at a current time, e.g., by indicating whether each user is indoors, outdoors, in the city, in a rural region, stationary, mobile, and so on.

Upon receiving the environment information, the common environment analysis component 906 operates by determining whether at least one aspect of the environment associated with the first user matches at least one aspect of the environment associated with the second user. If so, and based on application-specific configuration settings, the common environment analysis component 906 can determine that the two users are present in the same environment, which may correspond to the same physical region and/or the same physical circumstance.

The dashed-line box labeled "other trigger component(s)" 908 in FIG. 9 indicates that the trigger component 134 can employ yet other trigger components, although not expressly set forth in FIG. 9. For example, a behavioral-pattern component can make a determination of whether a behavioral pattern exists which indicates that two or more users are appropriate candidates to interact with a shared resource. For example, two users are good candidates to enter an interactive session when any of the following factors are met: (a) the users frequently communicate with each other; and/or (b) the users have recently communicated with each other; and/or (c) the users prefer to communicate with each other (which can be determined based on stored preference information associated with the users), and so on.

In another case, the trigger component 134 can include an express-selection component that allows any user to expressly set up an interactive session, e.g., thereby expressly choosing when to set up the interactive session, and with whom to set up the interactive session. For example, one user can select another user by selecting that other user in a listing of possible contacts. Alternatively, one user can select another user in direct fashion, e.g., using near field communication (NFC) mechanisms (e.g., by bringing his or her user device in close proximity to another's user device).

Figure 10:
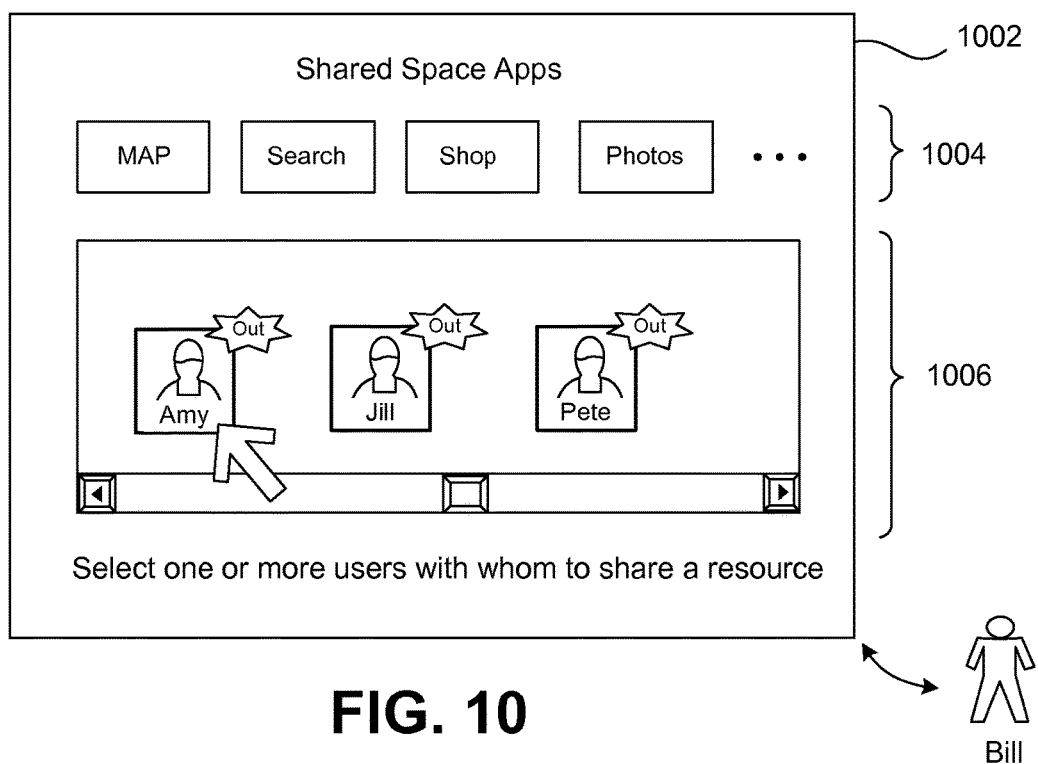
FIG. 10 shows a user interface presentation that allows a user to expressly invoke an interactive session with one or more other users.

FIG. 10 shows an example which illustrates a hybrid triggering component which combines the functionality of the behavioral-pattern component and the express-selection component. In a first example, assume that a user, e.g., Bill, first logs into the shared space, introduced in the context of FIG. 6. The CAA 102 may provide the user interface presentation 1002 to Bill at this time. The user interface presentation 1002 shows a collection of shared resources 1004 that can be shared with another user, e.g., corresponding to different applications. The user interface presentation 1002 may also present a panel 1006 which allows Bill to expressly choose a user (or users) with whom to establish an interactive session. Bill may select one of the shared resources 1004 and then select a participant from the panel 1006, or Bill may select a participant and then select a shared resource.

In a second example, the CAA 102 may present the panel 1006 outside the context of a shared resource presentation. For instance, the CAA 102 may integrate the panel 1006 into the output presentation provided by any application that displays contact information to the user, Bill, such as an Email application, an instant messaging application, and so on. The user, Bill, may select a participant with whom to enter an interactive session, and then select the resource to be shared. Still other session-invocation strategies are possible.

In either case, the hybrid triggering component can populate the users in the panel 1006 based on any consideration or combination of considerations. In one case, for instance, the hybrid triggering component can populate the panel 1006 with a list that contains all of the contacts of Bill. In another case, the hybrid-triggering component can select a subset of contacts based on any combination of: (a) pre-established preference information (set by Bill); (b) information regarding contacts with whom Bill is currently communicating; (c) information regarding contacts with whom Bill most frequently communicates; (d) information regarding contacts with whom Bill most recently communicated; (e) information regarding contacts who are physically closest to Bill at the present moment; (f) information regarding contacts who are available at the present time, and so on. The user, Bill, may then expressly choose one or more users from this list of candidate communication participants. Assume that Bill chooses to establish an interactive session with the user named Amy.

Returning to FIG. 9, a trigger assessment component 910 can receive output results generated by each of the above-described analysis components (902, 904, 906, etc.). The trigger assessment component 910 can then use application-specific logic to determine whether it is appropriate to invoke a shared user experience. For example, the trigger assessment component 910 can invoke a shared user experience when any single analysis component concludes that it is appropriate to do so, or when two or more analysis components agree that is appropriate to do so. In other cases, the trigger assessment component 910 can apply a machine-trained model, an expert system, etc. to determine whether to invoke the shared user experience, based on the results provided by the analysis components. In some cases, a user can override the automated selections of the trigger assessment component by expressly choosing when (and with whom) to invoke an interactive session, in the manner specified above.

Figure 11:
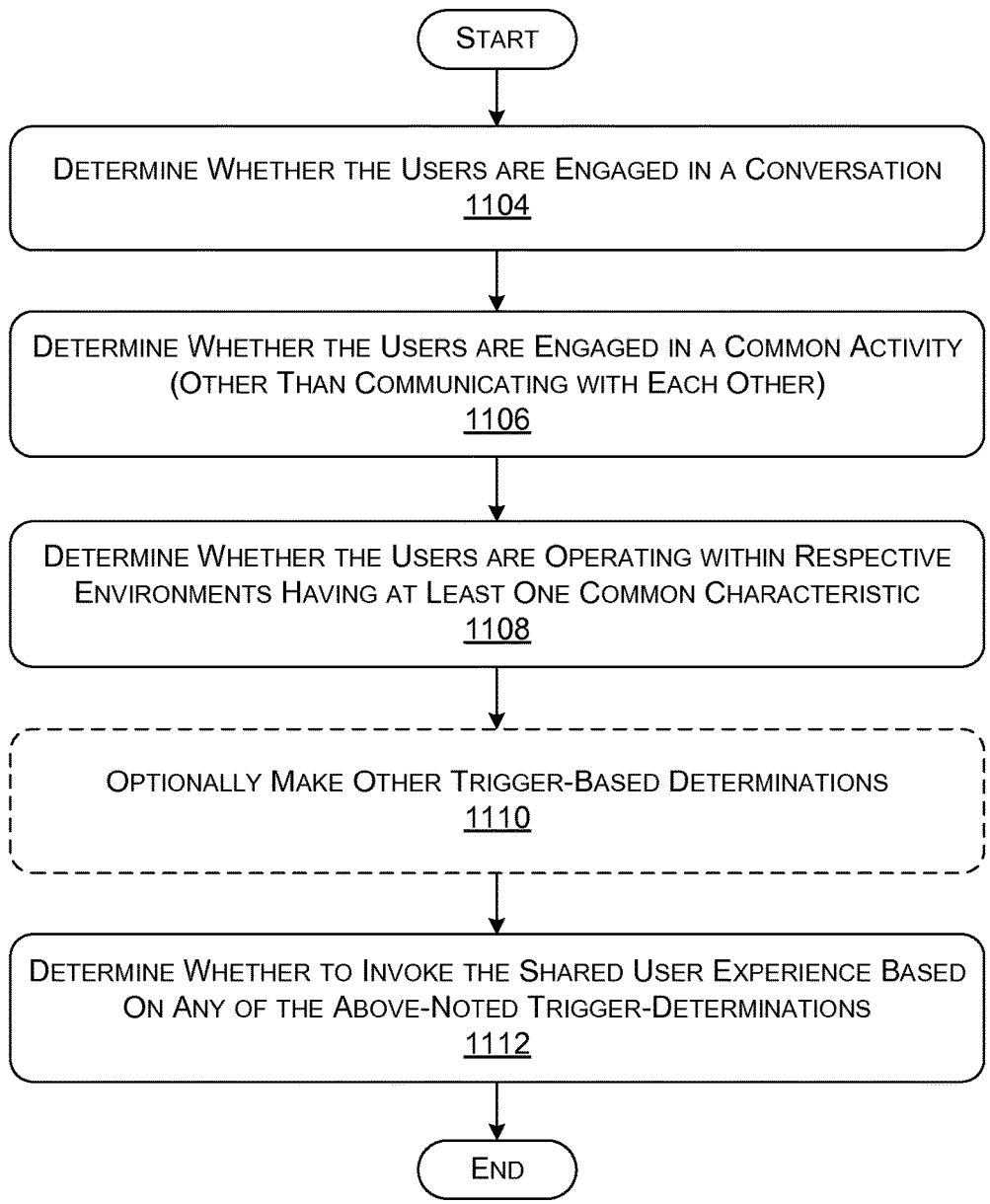
FIG. 11 shows a procedure which explains one manner of operation of the trigger component of FIG. 9.

FIG. 11 shows a procedure 1102 which explains one manner of operation of the trigger component 134 of FIG. 9. In block 1104, the conversation analysis component 902 determines whether the users are engaged in a synchronous or asynchronous communication session. In block 1106, the common activity analysis component 904 determines whether the users are engaged in a common activity, other than a communication activity. In block 1108, the common environment analysis component 906 determines whether the users are operating within respective environments having at least one common characteristic. In block 1110, the other triggering component(s) 908 optionally make any other trigger-determinations. In block 1112, the trigger assessment component 910 determines whether to invoke the shared user experience based on at any of the trigger-determinations made in blocks 1104-1110.

C. Resource Selection Component

Figure 12:
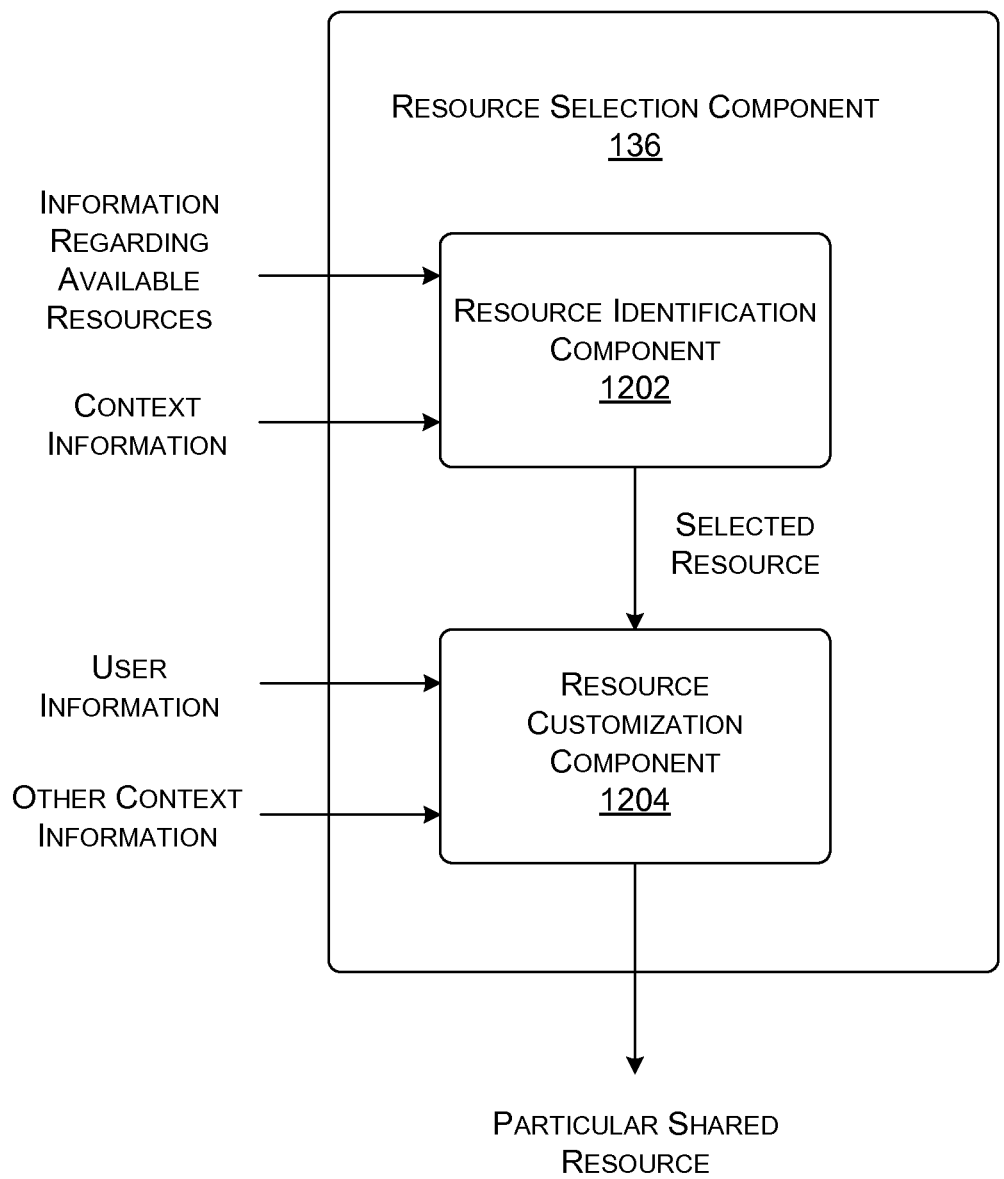
FIG. 12 shows one implementation of a resource selection component, which is another module within the setup component of FIG. 1.

FIG. 12 shows one implementation of the resource selection component 136, which is a module within the CAA 102 of FIG. 1. The resource selection component 136 determines the particular form of the shared user experience. More concretely stated, the resource selection component 136 determines a particular shared resource to provide to at least the first user and the second user.

In one implementation, the resource selection component 136 can include a resource identification component 1202 for choosing a selected shared resource (or plural shared resources), optionally from among two or more candidate sharable resources. The resource identification component 1202 can use any logic for making this decision. In one case, for example, the resource identification component 1202 can determine the subset of shared resources that both users are currently logged into. For example, in the context of FIG. 6, the list of applications in the shared space may correspond to the subset of shared resources that both Amy and Bill are currently logged into. The resource identification component 1202 can then opt to establish an interactive session with respect to each of the shared resources in the subset.

In addition or alternatively, the resource identification component 136 may enable either the first user or the second user to expressly choose the selected resource or resources. For example, in the context of FIG. 6, the first user (Amy) expressly chooses the interactive map application within the shared space. In some cases, a user is permitted to choose only a shared resource that he or she is currently logged into. In other cases, a user can select any shared resource, regardless of whether he or she is currently logged into that shared resource.

In other cases, the resource identification component 1202 can automatically choose the selected shared resource (or resources) based on context information. For example, the resource identification component 1202 can choose a shared resource based on the pre-established preferences of the first user and/or the second user. In addition, or alternatively, the resource identification component 1202 can choose the shared resource which is most appropriate for the circumstances in which the first user and the second user are communicating with each other, or about to communicate with each other. For example, assume that the two users are moving through a common region, such as a particular part of a city. The resource identification component 1202 can determine that an interactive map application may be most helpful to the users in their current setting, and based on their current behavior.

Whatever technique is used, again assume, for the sake of simplicity, that the resource identification component 1202 selects a single shared resource (although, as noted above, it may alternatively select a set of shared resources to be used to conduct the interactive session).

A resource customization component 1204 may optionally customize the selected resource based on user information and/or context information, to produce the particular shared resource that is presented to the users. For example, the resource customization component 1204 can determine, based on the user information, common-interest information that reflects interests shared by both the first user and the second user. The resource customization component 1204 can then add the common-interest information to the selected shared resource, to produce the particular shared resource.

In addition, or alternatively, the resource customization component 1204 can determine information that is relevant to the interests of the first user, but not necessarily relevant to the interests to the second user. Likewise, the resource customization component 1204 can determine information that is relevant to the interests of the second user, but not necessarily relevant to the interests to the first user. This information constitutes non-common interest information in the terminology used herein. The resource customization component 1204 can add the non-common interest information that is relevant to the first user to the instance of the shared resource that is presented first user, where that information is not also presented to the second user. Likewise, the resource customization component 1204 can add the non-common-interest information that is relevant to the second user to the instance of the shared resource that is presented to the second user, where that information is not also presented to the first user. As a result, any instance of the particular shared resource may include a shared portion and a non-shared portion. The shared portion is the same across both instances of the shared resource presented to the two respective users. The non-shared portions are not shared between the two instances.

Figure 13:
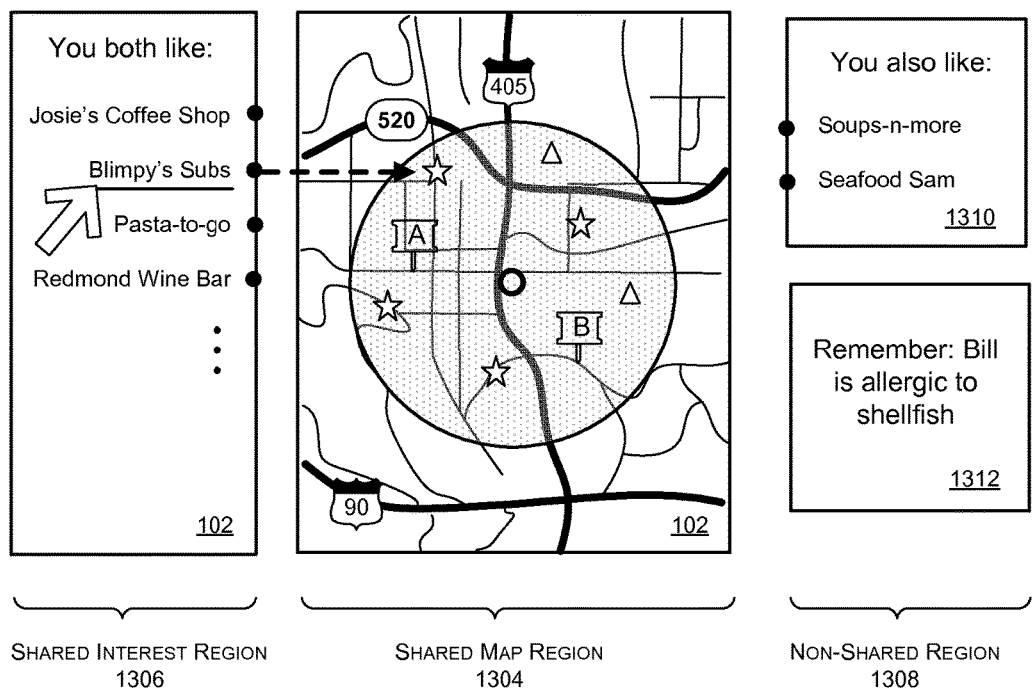
FIGS. 13 and 14 show user experiences offered by the CAA of FIG. 1, highlighting a customization function performed by the resource selection component of FIG. 9. More specifically.
Figure 14:
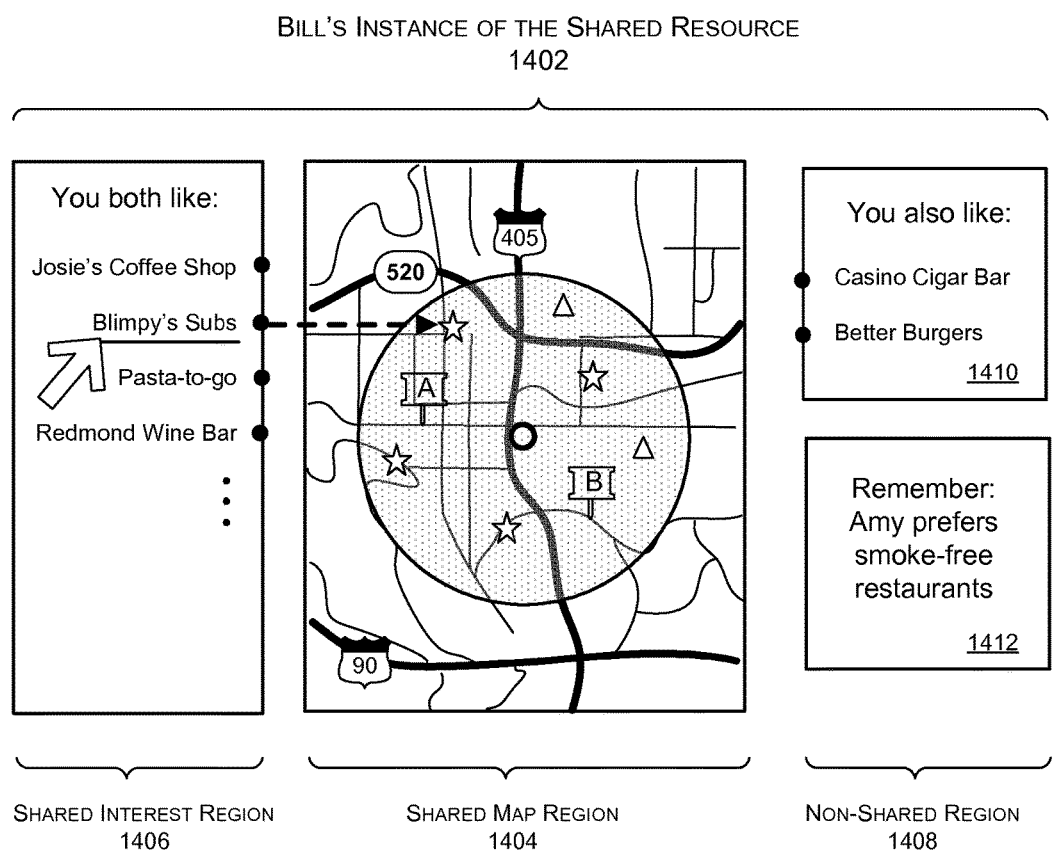

FIGS. 13 and 14 show a user experience offered by the CAA 102 of FIG. 1, particularly emphasizing the manner in which the resource selection component 136 (of FIG. 12) may customize a selected shared resource. More specifically, FIG. 13 shows an instance 1302 of a particular shared resource from the vantage point of a first user (Amy), while FIG. 14 shows an instance 1402 of the shared resource from the vantage point of a second user (Bill).

Beginning with FIG. 13, assume that the resource identification component 1202 decides to present an interactive map application to Amy and Bill, e.g., based on the express selection of either of these users and/or based on contextual factors. The resource customization component 1204 can then determine common-interest information that reflects the common interests of Amy and Bill. The resource customization component 1204 can make this determination without respect to a chosen theme, or with respect to a particular theme. For example, assume that either Amy or Bill expressly selects a restaurant-based theme. Alternatively, the resource customization component 1204 may automatically surmise that the users may be interested in a restaurant-based theme (e.g., based on time of day, and/or the users' mutual presence in the restaurant district of a city, etc.). In response, the resource customization component 1204 can perform an intersection of the restaurant-related interests of Amy and Bill to determine the names of restaurants that are liked by both Amy and Bill. The resource customization component 1204 can further refine the list of restaurants by determining a midpoint between the locations of Amy and Bill, and then selecting the subset of restaurants that lie within a particular radius of the midpoint. Or more generally, the resource customization component 1204 can determine that these users are both present in a particular part of a city, and as a result, only select restaurants that are located within that part of the city. The resource customization component 1204 can also determine one or more of Amy's interests that are not shared by Bill, and one or more of Bill's interests that are not shared by Amy.

In FIG. 13, the resource selection component 136 can display an instance of the interactive map in a shared map region 1304, for consumption by Amy. The resource selection component 136 can also present the common-interest information in a shared interest region 1306. In the above-described scenario, the common-interest information constitutes a listing of restaurants that are liked by both Amy and Bill, which also lie within proximity to their current respective locations. The resource selection component 136 can annotate the interactive map with information regarding the locations of the restaurants in any manner, such as by using symbols, pointers, popup information, etc.

The resource selection component 136 can also present information within a non-shared region 1308 that reflects the interests of Amy, but not necessarily Bill. For example, a panel 1310 lists restaurants liked by Amy, but not necessarily by Bill. A panel 1312 may include a reminder to Amy that may be useful in the context of her interaction with Bill, such as a reminder that Bill is allergic to shellfish. Such a suggestion may be expressly logged by either Amy or Bill, as part of these users' user information. Alternatively, or in addition, the resource selection component 136 can automatically surmise such a suggestion based on the prior behavior of Bill.

FIG. 14 shows the instance 1402 of the particular shared resource, as it appears to Bill. The instance includes a shared map region 1404 and a shared interest region 1406. These regions have the same appearance and behavior as the shared map region 1304 and the shared interest region 1306 of FIG. 13, respectively. The instance 1402 also includes a non-shared region 1408 that includes content that reflects the interests of Bill, but not necessarily Amy. For example, a panel 1410 reflects restaurants liked by Bill, but not Amy. A panel 1412 presents a suggestion to Bill that may be helpful in Bill's interaction with Amy, such as a reminder that Amy prefers smoke-free eating establishments.

Figure 15:
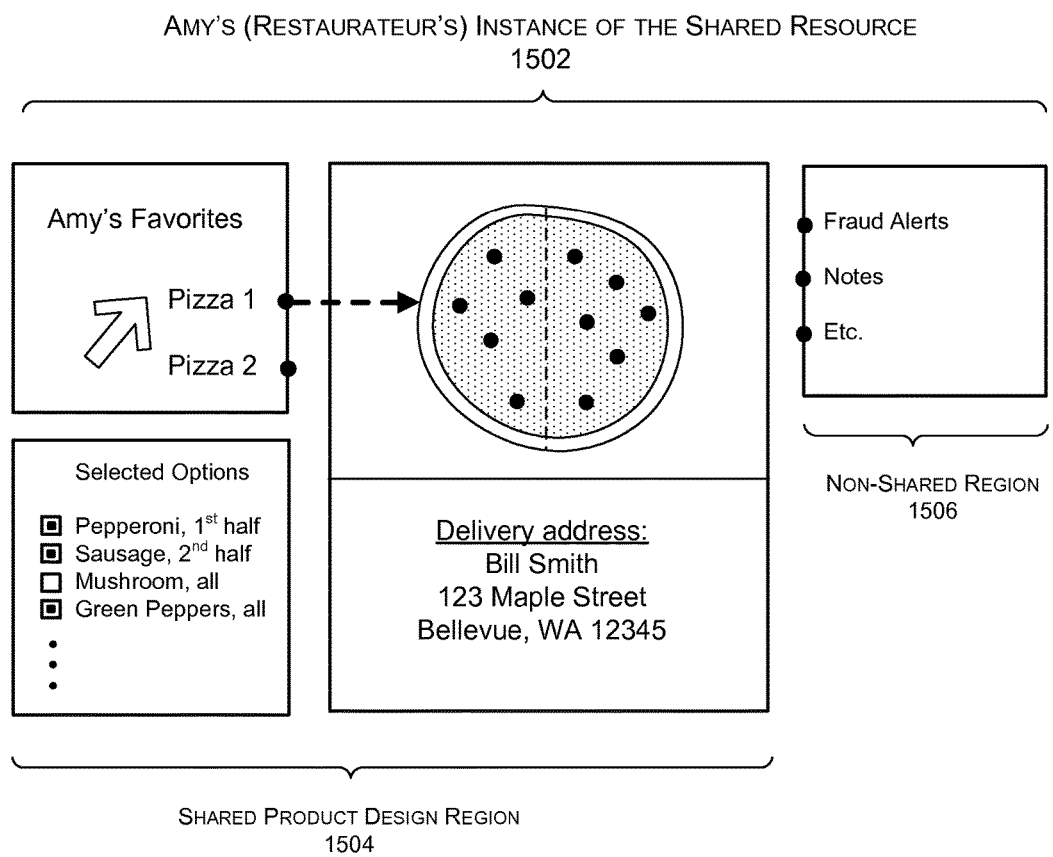
FIG. 15 shows another user experience offered by the CAA of FIG. 1, from the vantage point of one of the users.

FIG. 15 shows another example of an instance 1502 of a particular shared resource presented to one of the users, e.g., Amy. Here, the particular shared resource corresponds to an application that allows Bill (who is a customer) to order a pizza from Amy (who is a restaurateur that makes and delivers pizzas). More specifically, the instance 1502 includes a shared product design region 1504 that provides a design space for selecting pizza options. The instance 1502 also includes a non-shared region 1506 which includes information that is provided to Amy, but not necessarily Bill. For example, the region 1506 can include information regarding fraud alerts (e.g., identifying customers who pass bad checks), notes, etc. that are pertinent to Amy (the merchant), but may not be appropriate to present to Bill (the customer). In another example, the region 1506 may include upsell suggestions, such as a suggestion to invite Bill to purchase an additional food item, e.g., based on a determination that Bill has purchased the item on one or more prior occasions, but not the present occasion. Although not shown, Bill, the customer, interacts with another instance of the shared resource having the same shared regions shown in FIG. 15, but potentially a different non-shared region compared to the presentation shown in FIG. 15. For example, Bill's non-shared region may provide information regarding his participation in a rewards program of any type, and the consequence of his current transaction with respect to the rewards program.

Figure 16:
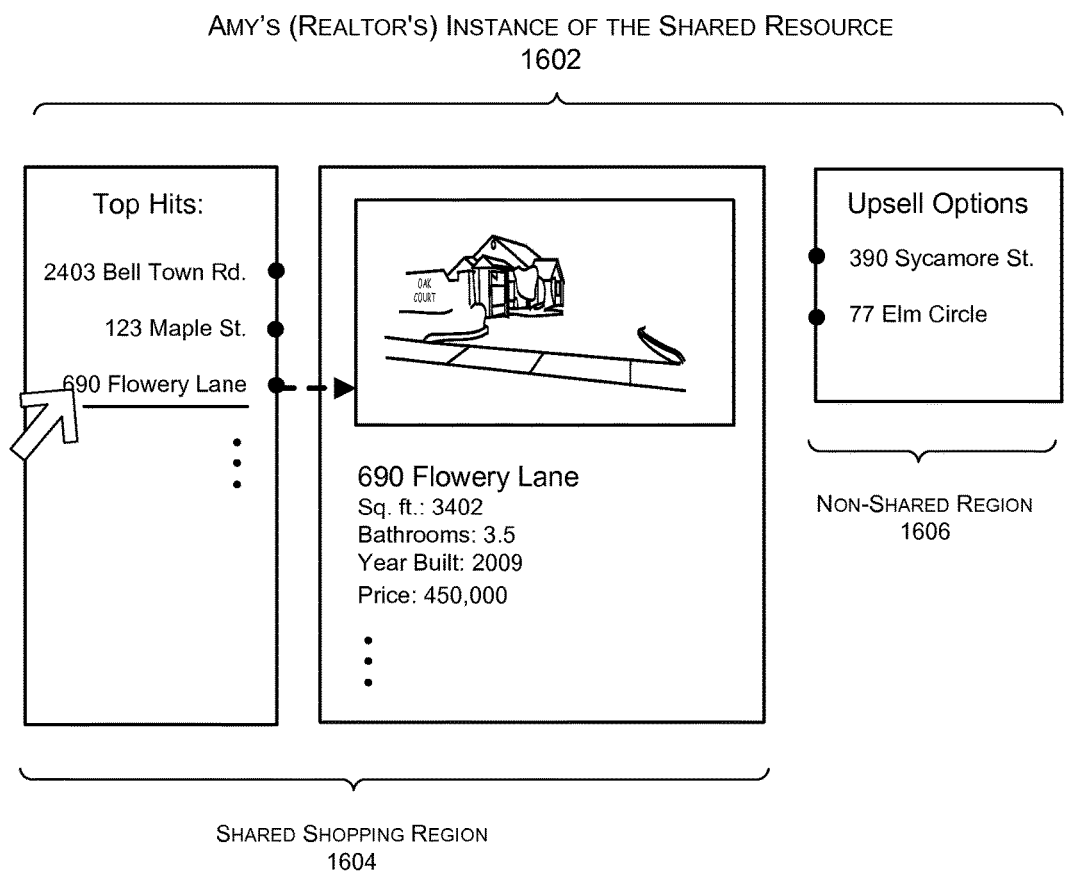
FIG. 16 shows another user experience provided by the CAA of FIG. 1, from the vantage point of one of the users.

FIG. 16 shows another example of an instance 1602 of a particular shared resource presented to one of the users, e.g., again, Amy. Here, the particular shared resource corresponds to an application that allows Bill (who is a customer) to review a list of properties with Amy (who is a Bill's real estate agent). In particular, the instance 1602 of the shared resource includes a shared shopping region 1604 that provides a space in which Amy and Bill may review properties that meet specified criteria. The instance 1602 also includes a non-shared region 1606 which provides information that is provided to Amy, but not Bill. For example, the region 1606 can include information regarding properties that are outside the price range preferred by Bill, but which Amy may nonetheless ask Bill to consider. Although not shown, Bill, the client, interacts with another instance of the shared resource having the same shared regions shown in FIG. 16, but potentially a different non-shared region compared to the presentation shown in FIG. 16.

Figure 17:
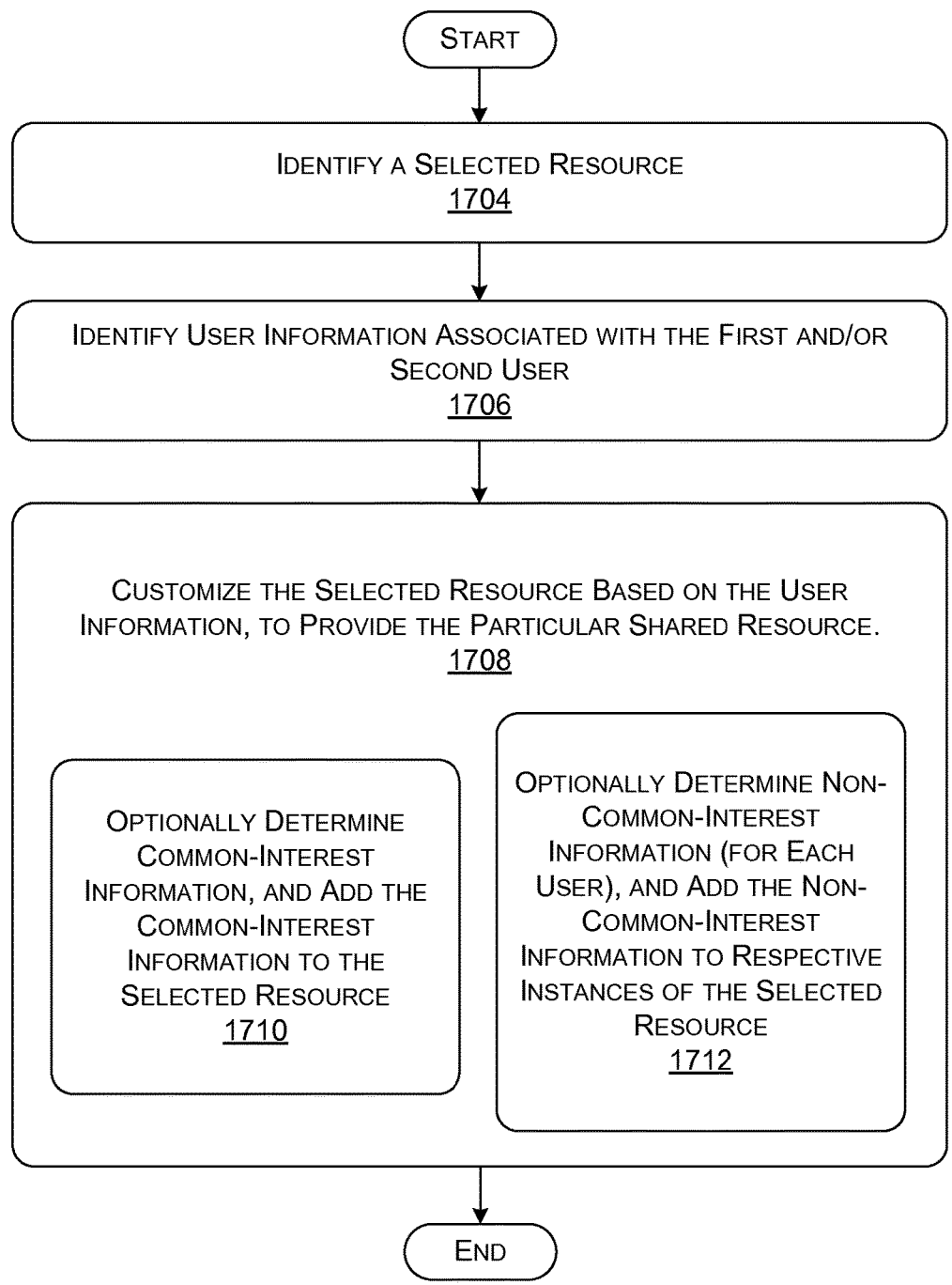
FIG. 17 shows a procedure which represents one manner of operation of the resource selection component of FIG. 12.

FIG. 17 shows a procedure 1702 which represents one manner of operation of the resource selection component 136 of FIG. 12. In block 1704, the resource identification component 1202 identifies a selected resource; in one case, for instance, the resource identification component 1202 identifies a resource in response to the user's selection of that resource. In block 1706, the resource identification component 1202 identifies user information associated with the first and/or second user, e.g., as maintained in the data stores 142. In block 1708, the resource customization component 1204 optionally customizes the selected resource based, at least in part, on the user information, to provide the particular shared resource. Block 1710 states that the customization may entail determining common-interest information, and adding the common-interest information to each instance of the selected resource. Block 1712 states that, in addition, or alternatively, the customization may entail determining non-common-interest information, and adding the non-common-interest information to each instance of the selected resource.

D. Participant Identification Component

Recall that the trigger component 134 identifies two or more users who are determined to be: (a) currently engaged in a conversation of any type; or (b) not currently engaged in a conversation, but who are in a mutual circumstance that is conducive to communication. In either case, the participant identification component 138 (shown in FIG. 1) resolves the identity of each user in sufficient detail to enable the delivery management component 130 to set up an interactive session involving that user.

For example, assume that the participant identification component 138 seeks to resolve the identities of the first user (Amy) and the second user (Bill) shown in FIGS. 5 and 6. With respect to Amy, the participant identification component 138 can glean first identity information from a conversation in progress (if any), such as Amy's telephone number. The participant identification component 138 can then use that first identity information as a lookup key to retrieve second identity information. The second identity information corresponds to any code (or codes) that are appropriate to establish an interactive session involving Amy; for instance one such code may correspond to a global account number for Amy that is associated with the CAA 102 or some more encompassing framework. The participant identification component 138 performs the same identity-resolution operations for Bill. The participant identification component 138 then forwards the collected identification information to the notification component 128 and the delivery management component 130, which enable these modules to appropriately contact Amy and Bill in the manner set forth in FIGS. 5 and 6.

The participant identification component 138 can also perform other functions besides resolving the identities of users. For example, the participant identification component 138 can choose who will take part in an interactive session. For instance, consider the scenario in which the trigger component 134 determines that five users are currently engaged in a five-way telephonic conference call, or are present in the same meeting room at the same time, and are therefore presumed to be engaged in a conversation. The participant identification component 138 can consult user preference information which conveys the communication-related preferences of each user in the room. In addition, or alternatively, the participant identification component 138 can determine the communication-related behaviors of the users in the room, e.g., by identifying users who frequently communicate with each other, and users who infrequently communicate with each other. The participant identification component 138 can take any of the above information into account by setting up an interactive session among a subset of the five communication participants in the room, that is, by identifying the people who are most likely to interact with a shared resource and/or most likely to benefit from such interaction.

E. Delivery Selection Component

Recall that the delivery selection component 140 performs the task of selecting the mode that is used to deliver the particular shared resource to the first user and the second user. As one aspect of this task, the delivery selection component 140 can determine the user devices that the users will use to interact with the shared resource.

More specifically, the delivery selection component 140 can consult the user information in the data stores 142 to determine a first family of devices associated with the first user, and a second family of devices associated with the second user. This information constitutes user device information. The delivery selection component 140 may then consult the user device information to pick at least one user device on which to present the shared user experience to the first user, selected from among the first family of devices; similarly, the delivery selection component 140 may pick at least one user device on which to present the shared user experience to the second user, selected from among the second family of user devices. The delivery selection component 140 may perform the above-described selection based on a consideration of one or more selection factors.

One selection factor corresponds to user preference information, indicating device preferences of the first user and the second user. For example, the user preference information may indicate that that Amy prefers to interact with shared resources on her smartphone, while Bill prefers to interact with shared resources on his tablet computing device. The delivery selection component 140 may attempt to honor such preference information, if feasible.

Another selection factor corresponds to device status information, which indicates, for each user device, whether it is active at a current time. The delivery selection component 140 may favor the selection of user devices that are currently active at the present time. In one particular case, for example, the delivery selection component 140 can select all of a user's devices on which the user is currently logged in, e.g., using a global user ID, or using two or more user IDs.

Another selection factor corresponds to device location information. The delivery selection component 140 may favor, for each user, the selection of a user device that is in close proximity to the user.

Figure 18:
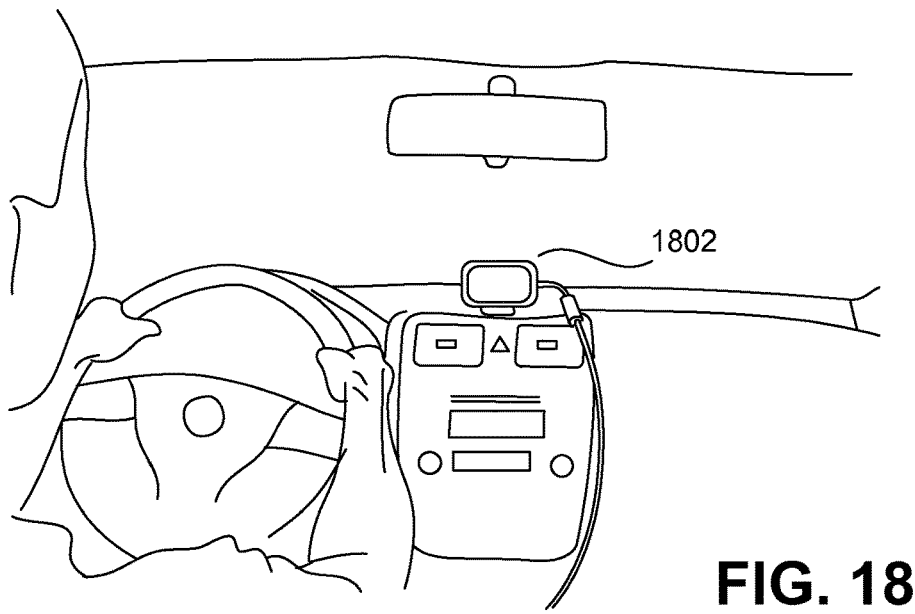
FIG. 18 shows a particular context in which a user is interacting with a particular kind of user device.

Another selection factor corresponds to current context information, which indicates, for each user, the current circumstance of the user. The delivery selection component 140 may favor, for each user, a user device that is appropriately suited for the user's current environment, as reflected by the current context information. For instance, the delivery selection component 140 may not attempt to set up an interactive session on the user's laptop computing device while the user is driving a vehicle, as the user cannot safely interact with the laptop computing device while driving. Instead, as shown in FIG. 18, the delivery selection component 140 may set up the interactive session on the user's smartphone 1802, which can be safely mounted on the vehicle's dashboard, and with which the user may interact via voice commands.

In addition, the delivery selection component 140 can select any other aspect of the interactive session, based on one or more selection factors. For example, the delivery selection component 140 can choose a user interaction mode associated with the shared resource. For instance, in the mobile environment shown in FIG. 18, the delivery selection component 140 may set up the delivery experience so that it may be controlled by voice commands, rather than, or in addition, to manipulation with the users' hands.

Figure 19:
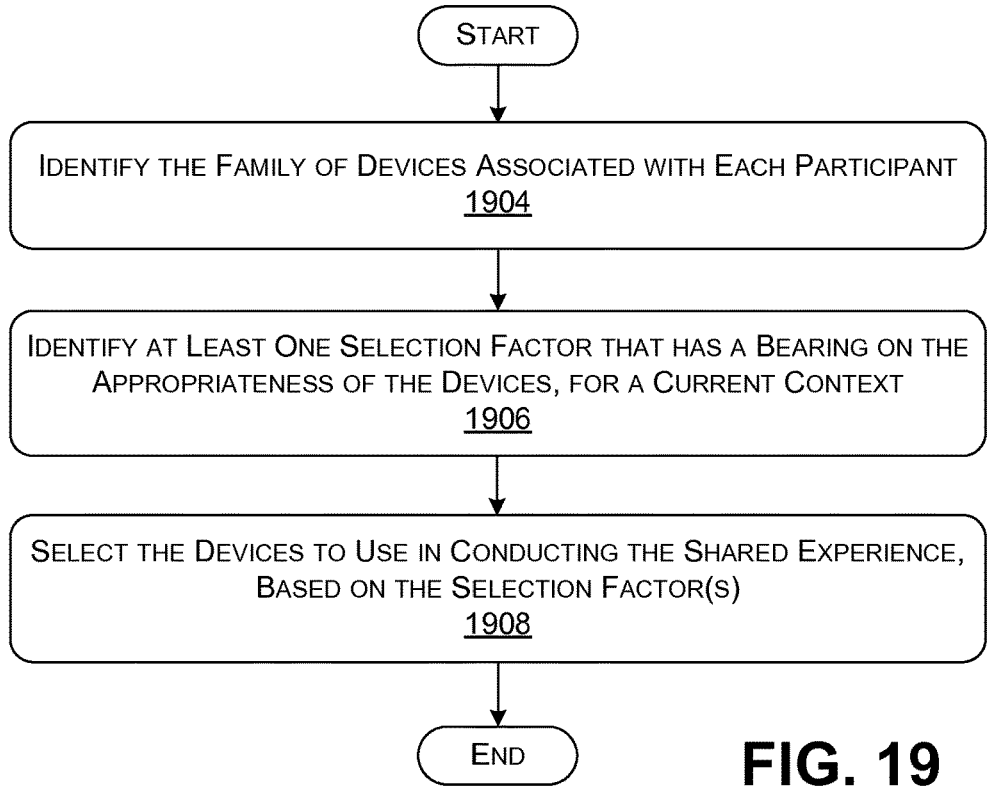
FIG. 19 shows a procedure which explains one manner of operation of a delivery selection component, which is another module of the setup component of FIG. 1.

FIG. 19 shows a procedure 1902 which explains one manner of operation of a delivery selection component 140 of FIG. 1. In block 1904, the delivery selection component 140 identifies the family of devices associated with each participant that is to take part in the interactive session. In block 1906, the delivery selection component 140 identifies at least one selection factor that has a bearing on the appropriateness of the devices, for use in conducting the interactive session. In block 1908, the delivery selection component 140 selects the devices to conduct the interactive session based on the selection factor(s).

F. Registration Component.

The registration component 132 (of FIG. 1) maintains registration information in the data stores 142 which indicates the registration status of each user with whom it may interact. A user who is registered with the CAA 102 is referred to as a registered user, while a user who is not registered with the CAA 102 is referred to as an unregistered user. The CAA 102 may provide a first suite of services to registered users and a second suite of services to unregistered users, the first suite being more robust than the second suite. The registration component 132 also includes functionality for handling the situation in which a first user, who is registered with the CAA 102, may wish to set up an interactive session with a second user, who is not currently registered with the CAA 102.

Figure 20:
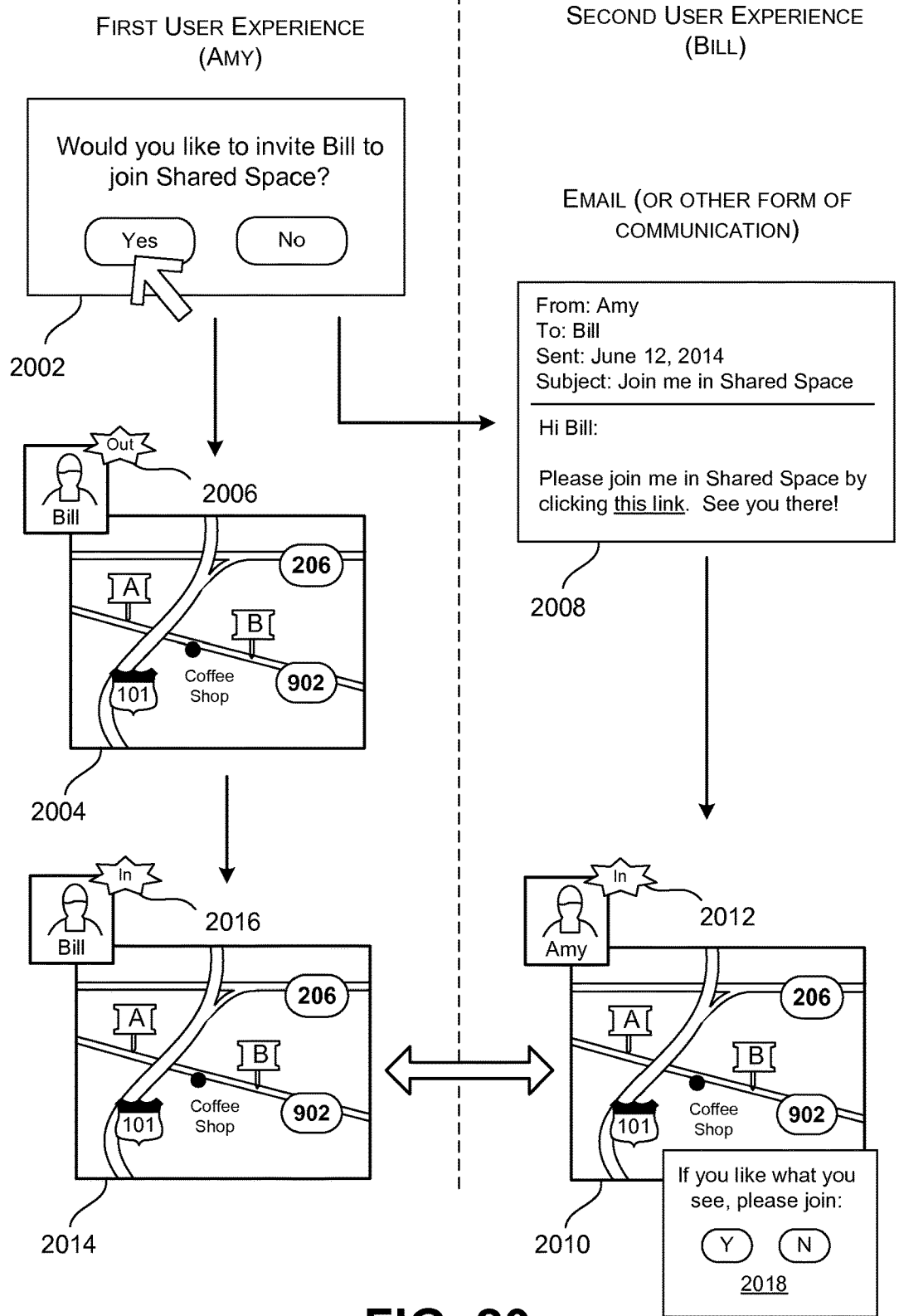
FIG. 20 shows a user experience that is provided by a registration component, which is another module of the CAA of FIG. 1.

Consider, for instance, the illustrative user experience shown in FIG. 20. In a first stage, the trigger component 134 may detect that it is appropriate to present a particular shared resource to a first user, Amy (who is registered with the CAA 102), and a second user who, Bill (who is not registered with the CAA 102). The trigger component 134 can determine that the first user is likely to be receptive to entering an interactive session in any manner, e.g., based on the express invocation of the session by the first user, and/or based on context information. The trigger component 134 can determine the existence and suitability of the second user (Bill) in any manner, even though that user is not currently registered with the CAA 102. For example, the trigger component 134 can determine the existence of Bill by examining the contact information associated with Amy, as provided in the central data stores 142 and/or on Amy's user devices.

To initiate the shared user experience, the notification component can send a notification 2002 to Amy. That notification 2002 asks whether Amy wishes to send Bill a message, which invites Bill to interact with the shared resource. Assume that Amy selects the "Yes" control associated with this notification 2002. In response, the delivery management component 130 provides an instance 2004 of the shared resource to Amy, corresponding to an interactive map application. An indicator 2006 indicates that the other user, Bill, has not yet joined the interactive session.

Further, in response to Amy selecting the "Yes" control, a message-sending mechanism can send a message 2008 to Bill, which invites Bill to join the interactive session. In one implementation, the message-sending mechanism may correspond to an application provided by one or Amy's user devices, or a remote message-sending service to which Amy has access. More specifically, the message-sending mechanism may correspond to any of an Email mechanism, SMS mechanism, instant messaging mechanism, social network posting mechanism, etc. In this scenario, the message-sending mechanism sends the message 2008 directly from Amy to Bill. In another case, the CAA 102 may implement the message-sending mechanism, e.g., by sending a message 2008 to Bill on behalf of Amy.

The message 2008 itself may include a mechanism by which Bill may activate functionality that enables him to interact with the shared resource. For example, the message 2008 may include a link on which Bill may click to download the functionality, or to otherwise access the functionality. Assume that Bill clicks on the link. In response, the accessed functionality delivers an instance 2010 of the shared user experience. That instance 2010 is accompanied by an indicator 2012 that indicates that Amy is currently interacting with the shared resource. At this juncture, Amy views her own instance 2014 of the shared resource, accompanied by an indicator 2016 which indicates that Bill is now currently interacting with the shared resource.

More specifically, although the CAA 102 presents Bill with an instance 2010 of the shared resource, he may not otherwise enjoy the same access rights to the full set of features that are available to Amy. This is because Bill is not a registered user, while Amy is a registered user. In connection therewith, the CAA 102 may send a message 2018 to Bill which invites Bill to officially register with the CAA 102, after which he will have access to the same functionality as Amy. Bill may then, on a later occasion, serve the same role as Amy in the above description, e.g., by serving as an agent which introduces another non-registered user to the services provided by the CAA 102. Generally, the CAA 102 may use the above-described protocol to expand its membership, in potentially exponential fashion.

Figure 21:
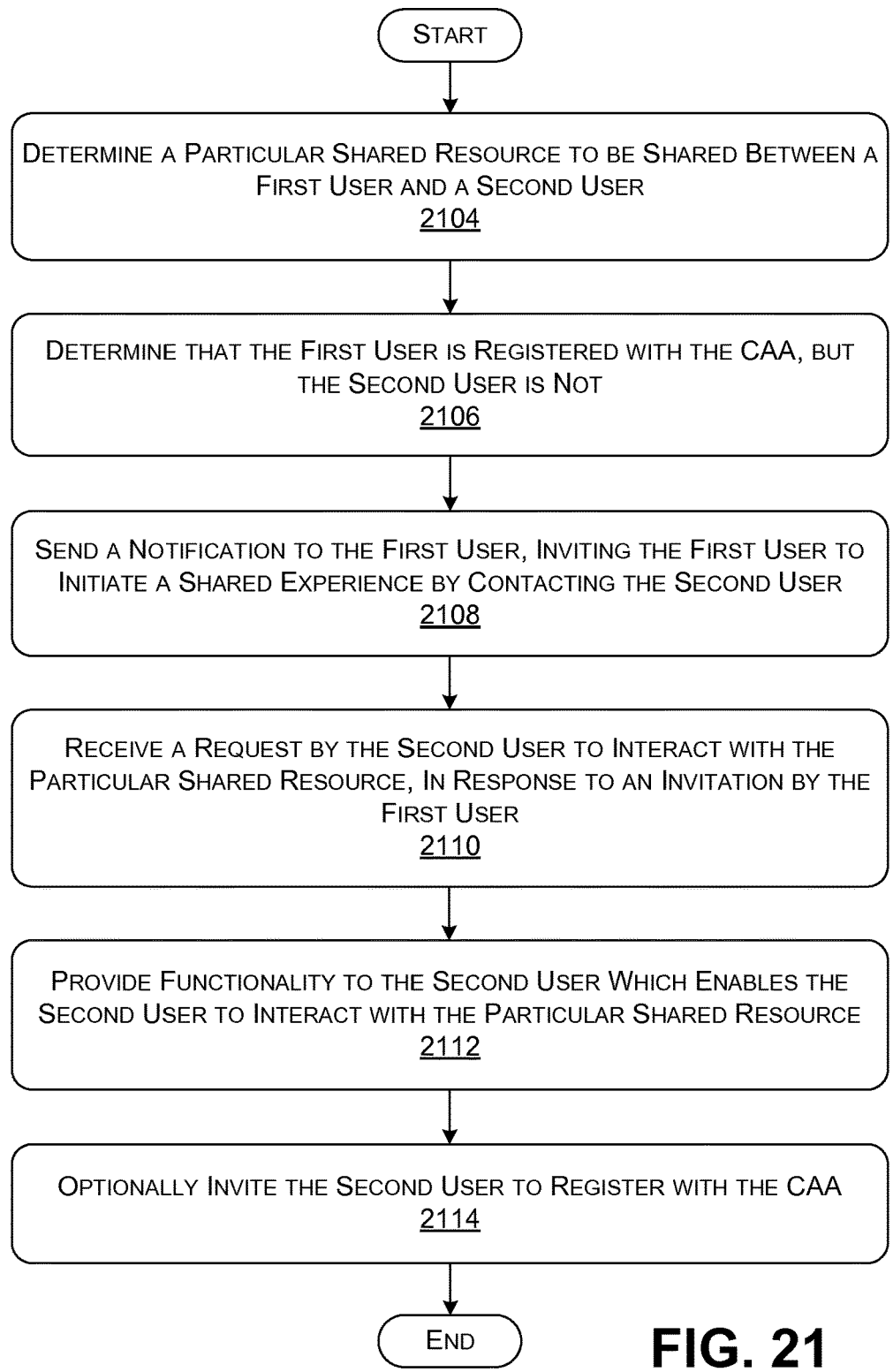
FIG. 21 shows a procedure which explains one manner of operation of the registration component of FIG. 1.

FIG. 21 shows a procedure 2102 which explains one manner of operation of the registration component 132 of FIG. 1. In block 2104, the setup component 126 identifies a particular shared resource to be shared between a first user and a second user. In block 2106, the registration component 132 determines that the first user is registered with the CAA 102, but the second user is not registered with the CAA 102. In block 2108, the notification component 128, under the direction of the registration component 132, sends a notification to the first user. The notification invites the first user to, in turn, invite the second user to initiate a shared user experience. In block 2110, the CAA 102 receives a request by the second user to interact with the shared resource, in response to a message sent from the first user to the second user, or a message sent to the second user by the CAA 102 on behalf of the first user. In block 2112, the CAA 102 provides functionality to the second user which enables the second user to interact with the shared resource. In block 2114, the CAA 102 optionally sends a message to the second user which invites the second user to register with the CAA 102.

G. Representative Computing Functionality

FIG. 22 shows computing functionality 2202 that can be used to implement any aspect of the environment 104 of FIG. 1. For instance, the type of computing functionality 2202 shown in FIG. 22 can be used to implement any aspect of the CAA system 404, any aspect of any user device, any aspect of the systems 412 for providing the sharable resources, any aspect of the telecommunications equipment 422, etc. In all cases, the computing functionality 2202 represents one or more physical and tangible processing mechanisms, such as one or more computing devices.

The computing functionality 2202 can include one or more processing devices 2204, such as one or more central processing units (CPUs), and/or one or more graphical processing units (GPUs), and so on.

The computing functionality 2202 can also include any storage resources 2206 for storing any kind of information, such as code, settings, data, etc. Without limitation, for instance, the storage resources 2206 may include any of: RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removal component of the computing functionality 2202. The computing functionality 2202 may perform any of the functions described above when the processing devices 2204 carry out instructions stored in any storage resource or combination of storage resources.

As to terminology, any of the storage resources 2206, or any combination of the storage resources 2206, may be regarded as a computer readable medium. In many cases, a computer readable medium represents some form of physical and tangible entity. The term computer readable medium also encompasses propagated signals, e.g., transmitted or received via physical conduit and/or air or other wireless medium, etc. However, the specific terms "computer readable storage medium" and "computer readable medium device" expressly exclude propagated signals per se, while including all other forms of computer readable media.

The computing functionality 2202 also includes one or more drive mechanisms 2208 for interacting with any storage resource, such as a hard disk drive mechanism, an optical disk drive mechanism, and so on.

The computing functionality 2202 also includes an input/output module 2210 for receiving various inputs (via input devices 2212), and for providing various outputs (via output devices 2214). Illustrative types of input devices include key entry devices, mouse entry devices, touchscreen entry devices, voice recognition entry devices, and so on. One particular output mechanism may include a presentation device 2216 and an associated graphical user interface (GUI) 2218. Other types of output devices include printer devices, voice output devices, and so on. The computing functionality 2202 can also include one or more network interfaces 2220 for exchanging data with other devices via a network 2222. One or more communication buses 2224 communicatively couple the above-described components together.

The network 2222 can be implemented in any manner, e.g., by a local area network, a wide area network (e.g., the Internet), point-to-point connections, etc., or any combination thereof. The network 2222 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 2202 can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

In closing, the functionality described above can employ various mechanisms to ensure the privacy of user data maintained by the functionality, in accordance with user expectations and applicable laws of relevant jurisdictions. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have described various concepts in the context of illustrative challenges or problems. This manner of explanation does not constitute a representation that others have appreciated and/or articulated the challenges or problems in the manner specified herein. Further, the claimed subject matter is not limited to implementations that solve any or all of the noted challenges/problems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computing devices comprising:
one or more processing devices; and
at least one computer readable storage medium storing computer readable instructions which, when executed by the one or more processing devices, cause the one or more processing devices to:
detect a conversation involving a first user and a second user;
after the conversation involving the first user and the second user has been detected:
perform customization of an application for use by the first user and the second user to provide a customized application for a shared user experience;
notify at least one of the first user and/or the second user of the existence of the customized application;
manage delivery of a first instance of the customized application to the first user and a second instance of the customized application to the second user;
cause first actions taken by the first user with respect to the first instance of the customized application to be duplicated on the second instance of the customized application; and
cause second actions taken by the second user with respect to the second instance of the customized application to be duplicated on the first instance of the customized application.

2. The one or more computing devices of claim 1, wherein the conversation is performed by the first user using a first user device and the conversation is performed by the second user using a second user device.

3. The one or more computing devices of claim 2, wherein the conversation comprises a synchronous or asynchronous verbal exchange of information.

4. The one or more computing devices of claim 2, wherein the conversation comprises a synchronous or asynchronous exchange of text messages, and wherein the computer readable instructions, when executed by the one or more processing devices, cause the one or more processing devices to:

customize the application and manage delivery of the first instance and the second instance of the customized application responsive to detecting the exchange of text messages.

5. The one or more computing devices of claim 2, wherein the one or more computing devices include the first user device and the conversation is detected on the first user device.

6. The one or more computing devices of claim 2, wherein the one or more computing devices include telecommunication equipment provided by a telecommunication provider, the telecommunication equipment detecting the conversation.

7. The one or more computing devices of claim 1, wherein the computer readable instructions, when executed by the one or more processing devices, cause the one or more processing devices to:

invoke the customized application based, at least in part, on a determination that the first user and the second user are located in a common area.

8. The one or more computing devices of claim 1, wherein the computer readable instructions, when executed by the one or more processing devices, cause the one or more processing devices to:

invoke the customized application based, at least in part, on one or more patterns of communicative behavior associated with the first user and/or the second user.

9. The one or more computing devices of claim 1, wherein the computer readable instructions, when executed by the one or more processing devices, cause the one or more processing devices to:

invoke the customized application based, at least in part, on an express selection by the first user and/or the second user.

10. The one or more computing devices of claim 1, wherein the computer readable instructions, when executed by the one or more processing devices, cause the one or more processing devices to:

identify user information associated with at least one of the first user and/or the second user, wherein the customization involves customizing the application based at least on the user information to produce the customized application.

11. The one or more computing devices of claim 10, wherein the computer readable instructions, when executed by the one or more processing devices, cause the one or more processing devices to:

determine common-interest information that is relevant to the first user and the second user based at least on the user information; and perform the customization by including the common-interest information in both the first instance and the second instance of the customized application.

12. The one or more computing devices of claim 1, wherein the computer readable instructions, when executed by the one or more processing devices, cause the one or more processing devices to:

determine first-user information that is relevant to the first user, but not to the second user and second-user information that is relevant to the second user, but not to the first user; and perform the customization by:

customizing the first instance of the application by including the first-user information and not the second-user information in the first instance of the customized application; and customizing the second instance of the application by including the second-user information and not the first-user information in the second instance of the customized application.

13. The one or more computing devices of claim 1, wherein the computer readable instructions, when executed by the one or more processing devices, cause the one or more processing devices to:

identify a first family of user devices associated with the first user and a second family of user devices associated with the second user;

select a first user device from among the first family of user devices to provide the first instance of the customized application to the first user, the first user device being selected based at least on a current activity status and location of each user device in the first family; and select a second user device from among the second family of user devices to provide the second instance of the customized application to the second user, the second user device being selected based at least on a current activity status and location of each user device in the second family.

14. The one or more computing devices of claim 13, wherein the computer readable instructions, when executed by the one or more processing devices, cause the one or more processing devices to:

select the first user device from the first family based at least on first user preference information indicating device preferences of the first user; and select the second user device from the second family based at least on second user preference information indicating device preferences of the second user.

15. The one or more computing devices of claim 1, wherein the first actions duplicated on the second instance include pointing actions.

16. The one or more computing devices of claim 1, wherein the first actions duplicated on the second instance include scrolling actions.

17. The one or more computing devices of claim 1, wherein the conversation is performed by the first user using a first user device associated with the first user, the conversation is performed by the second user using a second user device associated with a second user, and the computer readable instructions, when executed by the one or more processing devices, cause the one or more processing devices to:

cause the first instance of the customized application to be provided on the first user device; and cause the second instance of the customized application to be provided on the second user device.

18. The one or more computing devices of claim 1, wherein the conversation is performed by the first user using a first user device associated with the first user, the conversation is performed by the second user using a second user device associated with a second user, and the computer readable instructions, when executed by the one or more processing devices, cause the one or more processing devices to:

cause the first instance of the customized application to be provided on another first user device associated with the first user; and cause the second instance of the customized application to be provided on another second user device associated with the second user.

19. A system comprising:
one or more processing devices; and
at least one computer readable storage medium storing computer readable instructions which, when executed by the one or more processing devices, cause the one or more processing devices to:
determine when to offer a shared experience to at least a first user and a second user based at least on multiple trigger-determinations, the multiple trigger-determinations including at least a first trigger-determination that the first user and the second user are engaged in a conversation and a second trigger-determination that the first user and the second user are engaged in a common activity in addition to the conversation;
identify an application to be shared by the first user and the second user to provide the shared experience;
cause a first instance of the identified application to be presented to the first user and a second instance of the identified application to be presented to the second user;
cause first actions taken by the first user with respect to the first instance of the identified application to be duplicated on the second instance of the identified application; and
cause second actions taken by the second user with respect to the second instance of the identified application to be duplicated on the first instance of the identified application.

20. The system of claim 19, wherein the computer readable instructions, when executed by the one or more processing devices, cause the one or more processing devices to:
in a first instance, provide the shared experience responsive to a determination that the first user and the second user are separately accessing the same website; and
in a second instance, provide the shared experience responsive to a determination that the first user and the second user are separately accessing the same local application.

21. The system of claim 19, wherein the computer readable instructions, when executed by the one or more processing devices, cause the one or more processing devices to:
determine common-interest information that is relevant to the first user and the second user;
determine first-user information that is relevant to the first user, but not the second user;
determine second-user information that is relevant to the second user, but not the first user;
include the common-interest information and the first-user information, but not the second-user information, in the first instance of the identified application and deliver the first instance to the first user; and
include the common-interest information and the second-user information, but not the first-user information, in the second instance of the identified application and deliver the second instance to the second user.

22. A method comprising:
detecting a conversation involving a first user and a second user, the first user being associated with a plurality of first computing devices and the second user being associated with a plurality of second computing devices;
responsive to detecting the conversation, customizing a first instance of an application and presenting the first instance to the first user on a particular first computing device and customizing a second instance of the application and presenting the second instance to the second user on a particular second computing device, the first instance being customized differently than the second instance based at least on first interest information associated with the first user and second interest information associated with the second user;
duplicating first actions taken by the first user with respect to the first instance of the application in the second instance of the application; and
duplicating second actions taken by the second user with respect to the second instance of the application in the first instance of the application.

23. The method of claim 22, further comprising:
evaluating the plurality of first computing devices based at least on a selection factor to select the particular first computing device for presentation of the first instance of the application; and
evaluating the plurality of second computing devices based at least on the selection factor to select the particular second computing device for presentation of the second instance of the application,
wherein the selection factor relates to current device activity statuses of the plurality of first computing devices and the plurality of second computing devices.

24. The method of claim 22, further comprising:
displaying, in both the first instance of the application and the second instance of the application, a shared region comprising common-interest information shared by both the first user and the second user;
displaying, in a non-shared region of the first instance of the application, at least one item of second interest information associated with the second user that is not shared by the first user; and
displaying, in the non-shared region of the second instance of the application, at least one item of first interest information associated with the first user that is not shared by the second user.

* * * * *